United States Patent
Wang et al.

(10) Patent No.: US 12,055,914 B2
(45) Date of Patent: Aug. 6, 2024

(54) DATA PROCESSING METHOD, DEVICE AND SYSTEM, AND ELECTRONIC DEVICE

(71) Applicants: Beijing Zhongxiangying Technology Co., Ltd., Beijing (CN); BOE TECHNOLOGY GROUP CO., LTD., Beijing (CN)

(72) Inventors: Yu Wang, Beijing (CN); Haijin Wang, Beijing (CN); Jianmin Wu, Beijing (CN); Hong Wang, Beijing (CN)

(73) Assignees: BEIJING ZHONGXIANGYING TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 45 days.

(21) Appl. No.: 17/781,127

(22) PCT Filed: Oct. 30, 2020

(86) PCT No.: PCT/CN2020/125447
§ 371 (c)(1),
(2) Date: May 31, 2022

(87) PCT Pub. No.: WO2022/088084
PCT Pub. Date: May 5, 2022

(65) Prior Publication Data
US 2023/0004138 A1     Jan. 5, 2023

(51) Int. Cl.
*G05B 19/406*     (2006.01)
(52) U.S. Cl.
CPC .. *G05B 19/406* (2013.01); *G05B 2219/32204* (2013.01)
(58) Field of Classification Search
None
See application file for complete search history.

(56) References Cited

U.S. PATENT DOCUMENTS

| 5,890,143 A | 3/1999 | Sakurai |
| 2009/0240366 A1* | 9/2009 | Kaushal ............... G06N 20/00 700/110 |

(Continued)

FOREIGN PATENT DOCUMENTS

| CN | 101211296 A | 7/2008 |
| CN | 103100678 A | 5/2013 |

(Continued)

OTHER PUBLICATIONS

PCT International Search Report (with English translation) and Written Opinion for corresponding PCT Application No. PCT/CN2020/125447, mailed on Jul. 26, 2021, 9 pages.

(Continued)

*Primary Examiner* — Sean Shechtman
(74) *Attorney, Agent, or Firm* — Dority & Manning, P.A.

(57) ABSTRACT

A data processing method includes: obtaining a defect type of a sample set in response to a first input of a user on a first interface, the sample set including samples, each sample having a first parameter used to represent a defect degree of the sample with regard to the defect type and a second parameter used to represent device informations of sample production devices through which the sample passes; calculating yield purity indexes of sample production devices on the samples based on first parameters and second parameters of the samples, so as to obtain influencing parameters of the sample production devices, an influencing parameter of each sample production device being used to represent an influence degree to which the sample production device affects an occurrence of the defect type on the samples; and displaying the influencing parameters of the sample production devices on a second interface.

14 Claims, 10 Drawing Sheets

(56) References Cited

U.S. PATENT DOCUMENTS

| | | |
|---|---|---|
| 2014/0355866 A1 | 12/2014 | Shin et al. |
| 2017/0153630 A1 | 6/2017 | Cheng et al. |
| 2018/0033134 A1 | 2/2018 | Muthuvaradharajan |
| 2020/0334446 A1 | 10/2020 | Fang |

FOREIGN PATENT DOCUMENTS

| | | |
|---|---|---|
| CN | 103606114 A | 2/2014 |
| CN | 104407589 A | 3/2015 |
| CN | 106991240 A | 7/2017 |
| CN | 206450191 U | 8/2017 |
| CN | 108829052 A | 11/2018 |
| CN | 109711659 A | 5/2019 |
| CN | 110083636 A | 8/2019 |
| CN | 110276410 A | 9/2019 |
| CN | 110378586 A | 10/2019 |
| CN | 111026090 A | 4/2020 |
| CN | 111159645 A | 5/2020 |
| CN | 111221345 A | 6/2020 |
| CN | 111306058 A | 6/2020 |
| JP | H09330224 A | 12/1997 |
| JP | 2018163622 A | 10/2018 |
| TW | 200509274 A | 3/2005 |

OTHER PUBLICATIONS

Yunfeng, "Application of data mining techniques in probe data analysis" (w/ English abstract), University of Electronic Science and Technology of China, Engineering Master Dissertation, 2010, 74 pages.

Zhiyu et al., "A Review on the Application of Big Data Analysis in Manufacturing Industry", (w/ English abstract), Machinery, vol. 45, No. 6, 2018, 14 pages.

Chinese First Office Action (w/ English translation) for corresponding CN Application No. 202080002604.3, dated Dec. 5, 2022, 22 pages.

\* cited by examiner

500

300

(A)

(B)

(C)

DATA PROCESSING METHOD, DEVICE AND SYSTEM, AND ELECTRONIC DEVICE

CROSS-REFERENCE TO RELATED APPLICATION

This application is a national phase entry under 35 USC 371 of International Patent Application No. PCT/CN2020/125447, filed on Oct. 30, 2020, which is incorporated herein by reference in its entirety.

TECHNICAL FIELD

The present disclosure relates to the field of display technologies, and in particular, to a data processing method, a data processing device, a data processing system, and an electronic device.

BACKGROUND

In the manufacturing process of products, many processes and production devices will affect the performance of the product. Therefore, it is very important to find out the cause of a poor performance of the product SUMMARY In an aspect, a data processing method is provided. The data processing method includes: obtaining a defect type of a sample set in response to a first input of a user on a first interface, the sample set including a plurality of samples, each sample having a first parameter and a second parameter, the first parameter being used to represent a defect degree of the sample with regard to the defect type, and the second parameter being used to represent device informations of sample production devices through which the sample passes; calculating yield purity indexes of a plurality of sample production devices on the plurality of samples based on first parameters and second parameters of the plurality of samples, so as to obtain influencing parameters of the plurality of sample production devices, an influencing parameter of each sample production device being used to represent an influence degree to which the sample production device affects an occurrence of the defect type on the plurality of samples; and displaying the influencing parameters of the plurality of sample production devices on a second interface.

In some embodiments, the data processing method further includes: determining the plurality of sample production devices in response to a second input of the user on a third interface.

In some embodiments, the data processing method further includes: obtaining yield statistical data of the plurality of samples, or yield statistical data of the plurality of samples that pass through the sample production devices, or yield statistical data of the plurality of samples and yield statistical data of the plurality of samples that pass through the sample production devices according to the first parameters and the second parameters of the plurality of samples; and obtaining influencing parameters of the sample production devices according to the yield statistical data of the plurality of samples, or the yield statistical data of the plurality of samples that pass through the sample production devices, or the yield statistical data of the plurality of samples and the yield statistical data of the plurality of samples that pass through the sample production devices.

In some embodiments, obtaining the influencing parameters of the sample production devices according to the yield statistical data of the plurality of samples and the yield statistical data of the plurality of samples that pass through the sample production devices, includes: for each sample production device, calculating a Gini coefficient of the sample production device. The Gini coefficient of the sample production device satisfies a formula:

$$G = \frac{S_1}{T_1} \times \left[1 - \left(\frac{S_2}{S_1}\right)^2 - \left(\frac{S_3}{S_1}\right)^2\right] + \frac{T_1 - S_1}{T_1} \times \left[1 - \left(\frac{T_2 - S_2}{T_1 - S_1}\right)^2 - \left(\frac{T_3 - S_3}{T_1 - S_1}\right)^2\right],$$

where G represents the Gini coefficient of the sample production device, $S_1$ represents a total number of samples, which pass through the sample production device, in the plurality of samples, $T_1$ represents a total number of the plurality of samples, $S_2$ represents a total number of defective samples, which pass through the sample production device, in the plurality of samples, $T_2$ represents a total number of defective samples in the plurality of samples, $S_3$ represents a total number of non-defective samples, which pass through the sample production device, in the plurality of samples, and $T_3$ represents a total number of non-defective samples in the plurality of samples. The larger the Gini coefficient of the sample production device, the less the influence degree to which the sample production device affects the occurrence of the defect type on the plurality of samples.

In some embodiments, obtaining the influencing parameters of the sample production devices according to the yield statistical data of the plurality of samples and the yield statistical data of the plurality of samples that pass through the sample production devices, further includes: for each sample production device, calculating a chi-square distribution of samples, which pass through the sample production device, in the plurality of samples. The chi-square distribution satisfies a formula:

$$V = \begin{cases} \frac{K^{(Z/2-1)} e^{-K/2}}{2^{Z/2} \Gamma\left(\frac{Z}{2}\right)}, & K > 0; \\ 0, & K \leq 0 \end{cases},$$

where V represents the chi-square distribution of the samples, which pass through the sample production device, in the plurality of samples, Z represents a coefficient, K represents a chi-square value of the plurality of samples for the sample production device, and $$\Gamma\left(\frac{Z}{2}\right)$$

is a gamma distribution function.

In some embodiments, obtaining the influencing parameters of the sample production devices according to the yield statistical data of the plurality of samples and the yield statistical data of the plurality of samples that pass through the sample production devices, further includes: for each sample production device, obtaining a weight value of the sample production device according to the Gini coefficient of the sample production device and the chi-square distribution of the samples, which pass through the sample production device, in the plurality of samples, or a ratio of the total number of the defective samples, which pass through the sample production device, in the plurality of samples to the total number of the defective samples in the plurality of samples, or the Gini coefficient of the sample production device and the chi-square distribution of the samples, which pass through the sample production device, in the plurality of samples, and a ratio of the total number of the defective samples, which pass through the sample production device, in the plurality of samples to the total number of the defective samples in the plurality of samples. The larger the weight value of the sample production device, the greater the influence degree to which the sample production device affects the occurrence of the defect type on the plurality of samples.

In some embodiments, obtaining the weight value of the sample production device according to the Gini coefficient of the sample production device and the chi-square distribution of the samples, which pass through the sample production device, in the plurality of samples, and the ratio of the total number of the defective samples, which pass through the sample production device, in the plurality of samples to the total number of the defective samples in the plurality of samples, includes: obtaining the weight value of the sample production device according to a formula:

$$Q = A \times (1-V)^{\frac{1}{\sqrt{G}}} + B \times G - C \times (1-F)^2,$$

where Q is the weight value of the sample production device, A, B, and C are all scale factors, V is the chi-square distribution of the samples, which pass through the sample production device, in the plurality of samples, G is the Gini coefficient of the sample production device, and F is the ratio of the total number of the defective samples, which pass through the sample production device, in the plurality of samples to the total number of the defective samples in the plurality of samples.

In some embodiments, the first parameter of the sample includes a defect degree representation value of the sample. The data processing method further includes: determining a focus threshold in response to a third input of the user on a fourth interface; and dividing the plurality of samples into non-defective samples and defective samples according to defect degree representation values in the first parameters of the plurality of samples and the focus threshold.

In some embodiments, the first parameter of the sample includes a defect degree representation value of the sample. The data processing method further includes: obtaining a focus threshold according to defect degree representation values in the first parameters of the plurality of samples; and dividing the plurality of samples into non-defective samples and defective samples according to the defect degree representation values in the first parameters of the plurality of samples and the focus threshold.

In some embodiments, obtaining the focus threshold according to the defect degree representation values in the first parameters of the plurality of samples, includes: dividing an initial array into a first array and a second array according to a first index, the initial array including the defect degree representation values in the first parameters of the plurality of samples that are arranged in order of size, and the first index being used to indicate a division position in the initial array; obtaining a first average value of all elements in the first array and a second average value of all elements in the second array; generating a third array and a fourth array, the third array being composed of deviation degrees of all the elements of the initial array compared with the first average value, and the fourth array being composed of deviation degrees of all the elements of the initial array compared with the second average value; determining a second index, the second index being used to indicate a position at which a positive-negative inversion occurs in differences between all the elements in the third array and corresponding elements in the fourth array; updating the first index to the second index if the second index is not equal to the first index, and repeating the above steps until the first index is equal to the second index; and calculating an average value of two adjacent elements in the first array and the second array corresponding to the first index as the focus threshold.

In some embodiments, if a number of the defect degree representation values in the first parameters of the plurality of samples in the initial array is even, the first index is one-half of a value of the number of the defect degree representation values in the first parameters of the plurality of samples in the initial array or an integer that is obtained by subtracting one from one-half of the value.

If the number of the defect degree representation values in the first parameters of the plurality of samples in the initial array is odd, the first index is an integer obtained by rounding up or rounding down one-half of the value of the number of the defect degree representation values in the first parameters of the plurality of samples in the initial array; or, the first index is an integer obtained by rounding up or rounding down a value that is obtained by subtracting one from one-half of the value of the number of the defect degree representation values in the first parameters of the plurality of samples in the initial array.

In some embodiments, the data processing method further includes: displaying a distribution diagram of the first parameters of the plurality of samples on a fifth interface.

In some embodiments, the data processing method further includes: creating the sample set in response to a fourth input of the user on a sixth interface.

In another aspect, a data processing method is provided. The data processing method includes: obtaining a defect type of a sample set, the sample set including a plurality of samples, each sample having a first parameter and a second parameter, the first parameter being used to represent a defect degree of the sample with regard to the defect type, and the second parameter being used to represent device informations of sample production devices through which the sample passes; and calculating yield purity indexes of a plurality of sample production devices on the plurality of samples based on first parameters and second parameters of the plurality of samples, so as to obtain influencing parameters of the plurality of sample production devices, an influencing parameter of each sample production device being used to represent an influence degree to which the sample production device affects an occurrence of the defect type on the plurality of samples.

In some embodiments, the data processing method further includes: obtaining yield statistical data of the plurality of samples, or yield statistical data of the plurality of samples that pass through the sample production devices, or yield statistical data of the plurality of samples and yield statistical data of the plurality of samples that pass through the sample production devices according to the first parameters and the second parameters of the plurality of samples; and obtaining influencing parameters of the sample production devices according to the yield statistical data of the plurality of samples, or the yield statistical data of the plurality of samples that pass through the sample production devices, or the yield statistical data of the plurality of samples and the yield statistical data of the plurality of samples that pass through the sample production devices.

In some embodiments, the first parameter of the sample includes a defect degree representation value of the sample. The data processing method further includes: obtaining a focus threshold; and dividing the plurality of samples into non-defective samples and defective samples according to defect degree representation values in the first parameters of the plurality of samples and the focus threshold.

In some embodiments, obtaining the focus threshold, includes: obtaining the focus threshold according to the defect degree representation values in the first parameters of the plurality of samples.

In some embodiments, obtaining the focus threshold according to the defect degree representation values in the first parameters of the plurality of samples, includes: dividing an initial array into a first array and a second array according to a first index, the initial array including the defect degree representation values in the first parameters of the plurality of samples that are arranged in order of size, and the first index being used to indicate a division position in the initial array; obtaining a first average value of all elements in the first array and a second average value of all elements in the second array; generating a third array and a fourth array, the third array being composed of deviation degrees of all the elements of the initial array compared with the first average value, and the fourth array being composed of deviation degrees of all the elements of the initial array compared with the second average value; determining a second index, the second index being used to indicate a position at which a positive-negative inversion occurs in differences between all the elements in the third array and corresponding elements in the fourth array; updating the first index to the second index if the second index is not equal to the first index, and repeating above steps until the first index is equal to the second index; and calculating an average value of two adjacent elements in the first array and the second array corresponding to the first index as the focus threshold.

In yet another aspect, a data processing device is provided. The data processing device includes a memory and a processor. The memory has stored thereon one or more computer programs. The processor is coupled to the memory; and the processor is configured to execute the computer programs to cause the data processing device to implement the data processing method as described in any of the above embodiments.

In yet another aspect, an electronic device is provided. The electronic device includes the data processing device as described in any of the above embodiments and a display device. The display device is configured to display interfaces.

In yet another aspect, a data processing system is provided. The data processing system includes the data processing device as described in any of the above embodiments, a distributed storage device, and a display device. The distributed storage device is configured to store production data generated by a plurality of sample production devices. The display device is configured to display interfaces.

In yet another aspect, a non-transitory computer-readable storage medium is provided. The computer-readable storage medium has stored thereon computer program instructions that, when run on a computer, causes the computer to execute the data processing method as described in any one of the above embodiments.

BRIEF DESCRIPTION OF THE DRAWINGS

In order to describe technical solutions in the present disclosure more clearly, the accompanying drawings to be used in some embodiments of the present disclosure will be introduced briefly below. However, the accompanying drawings to be described below are merely accompanying drawings of some embodiments of the present disclosure, and a person of ordinary skill in the art can obtain other drawings according to these drawings.

In addition, the accompanying drawings to be described below may be regarded as schematic diagrams, and are not limitations on an actual size of a product, an actual process of a method and an actual timing of a signal involved in the embodiments of the present disclosure.

DETAILED DESCRIPTION

Figure 1:
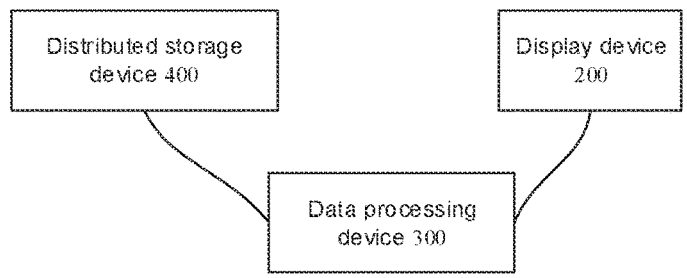
FIG. 1 is a structural diagram of a data processing system, in accordance with some embodiments.

Technical solutions in some embodiments of the present disclosure will be described clearly and completely below with reference to the accompanying drawings. However, the described embodiments are merely some but not all embodiments of the present disclosure. All other embodiments obtained based on the embodiments of the present disclosure by a person of ordinary skill in the art shall be included in the protection scope of the present disclosure.

Unless the context requires otherwise, throughout the description and the claims, the term "comprise" and other forms thereof such as the third-person singular form "comprises" and the present participle form "comprising" are construed as an open and inclusive meaning, i.e., "including, but not limited to." In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics may be included in any one or more embodiments or examples in any suitable manner.

Hereinafter, the terms "first" and "second" are used for descriptive purposes only, and are not to be construed as indicating or implying the relative importance or implicitly indicating the number of indicated technical features. Thus, a feature defined with "first" or "second" may explicitly or implicitly include one or more of the features. In the description of the embodiments of the present disclosure, the term "a plurality of/the plurality of" means two or more unless otherwise specified.

In the description of some embodiments, the terms such as "coupled" and "connected" and derivatives thereof may be used. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the content herein.

As used herein, depending on the context, the term "if" is optionally construed as "when" or "in a case where" or "in response to determining" or "in response to detecting". Similarly, depending on the context, the phrase "if it is determined . . . " or "if [a stated condition or event] is detected" is optionally construed as "in a case where it is determined . . . " or "in response to determining . . . " or "in a case where [the stated condition or event] is detected" or "in response to detecting [the stated condition or event]".

The phrase "applicable to" or "configured to" used herein has an open and inclusive meaning, which does not exclude devices that are applicable to or configured to perform additional tasks or steps.

In addition, the phrase "based on" used herein has an open and inclusive meaning, since a process, step, calculation or other action that is "based on" one or more of the stated conditions or values may, in practice, be based on additional conditions or values exceeding those stated.

Terms such as "about" or "approximately" as used herein includes a stated value and an average value within an acceptable range of deviation of a particular value. The acceptable range of deviation is determined by a person of ordinary skill in the art in view of the measurement in question and the error associated with the measurement of a particular quantity (i.e., the limitations of the measurement system).

In related technologies, in the process of producing and manufacturing products, factors such as the production processes or the production devices may cause the product to be defective. Due to the complicated production processes and the large number of products produced, it is difficult to find out the cause of the defects manually. As a result, the timeliness and accuracy of processing data are limited, and cannot meet the requirements of the increasing demand for production.

Embodiments of the present disclosure provide a data processing system. As shown in FIG. 1, the data processing system 100 includes a data processing device 300, a display device 200 and a distributed storage device 400. The data processing device 300 is coupled to the display device 200 and the distributed storage device 400.

The distributed storage device 400 is configured to store production data generated by a plurality of sample production devices (which may also be referred to as factory equipments). For example, the production data generated by the plurality of sample production devices includes production records of the plurality of sample production devices. For example, the production records include information about the sample production devices through which the plurality of samples pass in their respective production processes and information about defect types of the plurality of samples. Each sample passes through multiple sample production devices in its production process, and each sample production device participates in and only participates in production process(es) of some of the plurality of samples.

The distributed storage device stores thereon relatively complete data (such as a database). The distributed storage device may include a plurality of hardware memories, and different hardware memories are distributed in different physical locations (such as in different factories, or on different production lines), and communicate with each other through wireless transmission (such as the network), so that the data is distributed but logically form a database based on big data technology.

Figure 2:
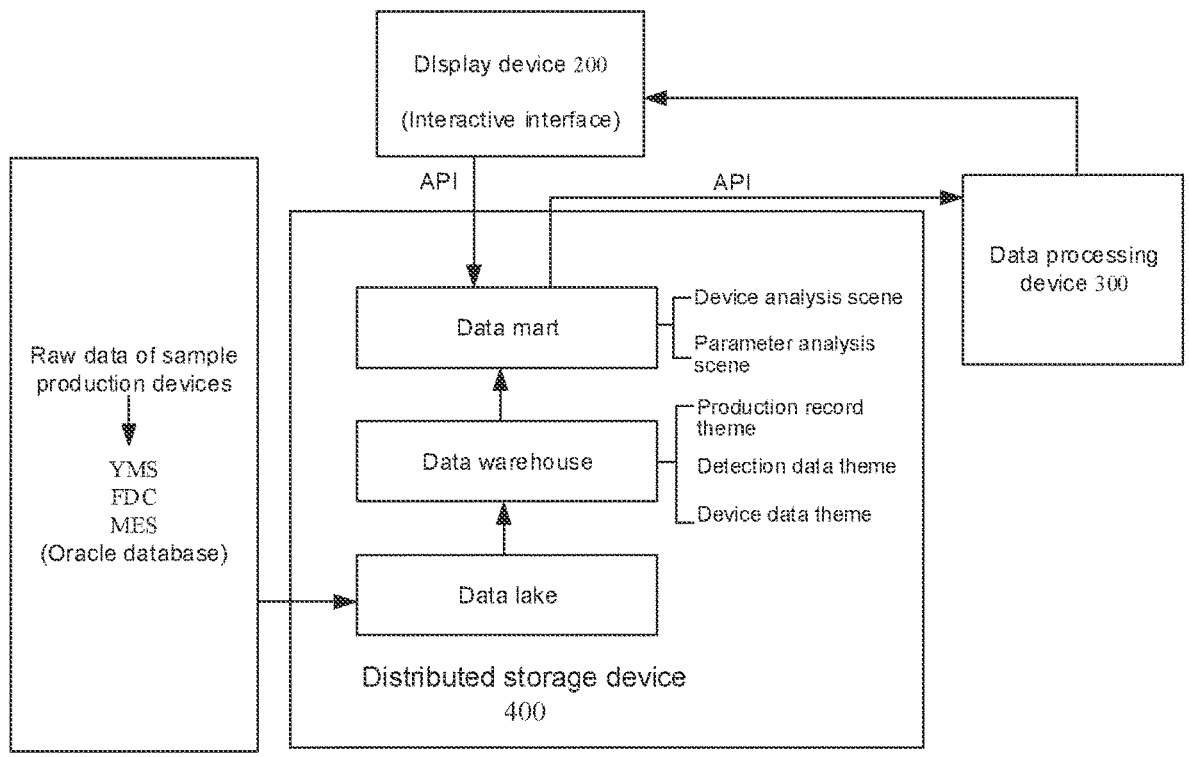
FIG. 2 is a schematic diagram showing information interaction in a data processing system, in accordance with some embodiments.

Referring to FIG. 2, a large amount of raw data of different sample production devices is stored in corresponding manufacturing systems, e.g., in relational databases (e.g., Oracle or Mysql) of the systems such as a yield management system (YMS), a fault detection and classification (FDC), and a manufacturing execution system (MES). Such raw data may be extracted in an original table manner by a data extraction tool (e.g., Sqoop or Kettle) to be transmitted to the distributed storage device (e.g., a Hadoop distributed file system (HDFS)), so as to reduce the load on the sample production devices and manufacturing systems, and facilitate data reading of an analysis device in a subsequent process.

The data in the distributed storage device may be stored by a Hive tool or in a HBase database format. For example, according to the Hive tool, the raw data is first stored in a data lake. And then, the raw data may be subjected to pretreatment (e.g., data cleaning and data conversion) in the Hive tool according to application themes, scenes, etc. of the data, so as to obtain a data warehouse with different themes (e.g., a production record theme, a detection data theme and a device data theme), and data marts with different scenes (e.g., a device analysis scene and a parameter analysis scene). The data marts may be connected to a display device, an analysis device, etc. through different application programming interfaces (APIs), so as to realize data interaction with these devices.

Since a plurality of sample production devices in a plurality of factories are involved, the raw data is in a large volume. For example, all sample production devices may generate several hundred gigabytes of raw data every day, and generate dozens of gigabytes of raw data every hour.

For example, there are mainly two solutions for the storage and calculation of massive structured data, i.e., a grid computing solution of a relational database management system (RDBMS), and a big data solution of a distributed file system (DFS).

The grid computing of the RDBMS is to divide a problem, which requires tremendous computing power, into many small parts, distribute these parts to many computers for separate processing, and then combine the calculation results. For example, Oracle real application clusters (RAC) is a core technology of grid computing supported by an Oracle database, and all servers may directly access all data in the database. However, the application system of the grid computing of the RDBMS cannot meet users' requirements when there is a large amount of data. For example, since the expansion space of hardware is limited, when the data is increased to an order of magnitude that is large enough, the data processing efficiency will be very low due to an input/output bottleneck of the hard disk.

The big data technology based on the DFS allows the use of a plurality of inexpensive hardware devices to build large clusters to process massive amounts of data. For example, the Hive tool is a data warehouse tool based on Hadoop, which may be used for data extraction, transformation and loading (ETL). The Hive tool defines a simple SQL-like query language, and also allows Mapper and Reducer in user-defined MapReduce to default complex analysis work that the tool cannot do. The Hive tool does not have a designated data storage format, nor does it create an index for the data. Users may freely organize tables therein, so as to process the data in the database. It will be seen that, the parallel processing of the DFS may satisfy the storage and processing requirements of massive data. Users may use SQL query for simple data processing, and use custom functions to realize complex data processing. Therefore, during analysis of the massive data of a factory, the data of the factory's database needs to be extracted into a DFS. In this way, not only the raw data will not be damaged, but also the data analysis efficiency will be improved.

For example, the distributed storage device 400 may be one memory, or may include a plurality of memories, or may be a general term for a plurality of storage elements. For example, the memories may include a random access memory (RAM) and a double data rate synchronous dynamic random access memory (DDR SRAM), and may also include a non-volatile memory, such as a disk storage or a flash memory.

The data processing device 300 is configured to implement a data processing method described in any of the following embodiments. For example, the data processing device 300 may obtain production records of a plurality of sample production devices; determine an influencing parameter of each sample production device according to the production records of the plurality of sample production devices; and determine a correlation between the sample production device and an occurrence of a defect type on the samples according to the influencing parameter.

The display device 200 is configured to display interfaces. For example, the interfaces may include a first interface, a second interface, a third interface, etc. as described below. For example, the display device 200 may display a processing result (such as the influencing parameters) of the data processing device 300.

For example, the display device maybe a display, or a product including a display, such as a television, a computer (all-in-one computer or desktop computer), a tablet computer, a mobile phone, or an electronic display screen. For example, the display device may be any device that displays an image whether in motion (e.g., a video) or stationary (e.g., a static image), and whether literal or graphical. More specifically, it is anticipated that the described embodiments may be implemented in or associated with a variety of electronic devices, such as (but not limited to) game consoles, television monitors, flat panel displays, computer monitors, automotive displays (e.g., odometer displays, etc.), navigators, cockpit controllers or cockpit displays or cockpit controllers and cockpit displays, electronic photos, electronic billboards or signs, projectors, building structures, packaging and aesthetic structures (e.g., a display for an image of a piece of jewelry).

For example, the display device described herein may include one or more displays, or may include one or more terminals with a display function. Therefore, the data processing device may send data processed by the data processing device (such as the influencing parameters) to the display device, and then the display device displays the processed data. That is, a complete interaction (controlling and receiving results) between a user and a system for analyzing causes of a defect of a sample may be achieved through the interface (i.e., a user interaction interface) of the display device.

Figure 3:
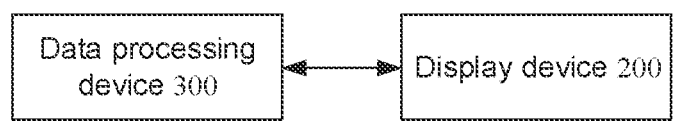
FIG. 3 is a structural diagram of an electronic device, in accordance with some embodiments.

Embodiments of the present disclosure provide an electronic device. For example, the electronic device may be a computer, and so forth. As shown in FIG. 3, the electronic device 500 includes a data processing device 300 and a display device 200. The display device 200 is coupled to the data processing device 300.

The data processing device 300 is configured to implement the data processing method as described in any of the following embodiments. The display device 200 is configured to display interfaces. For example, the display device 200 is configured to display the processing result of the data processing device 300.

It will be noted that, the data processing and display devices in the electronic device are similar to the data processing and display devices in the data processing system described above. As for details of the data processing and display devices in the electronic device, reference may be made to the above description, which will not be repeated herein.

Figure 4:
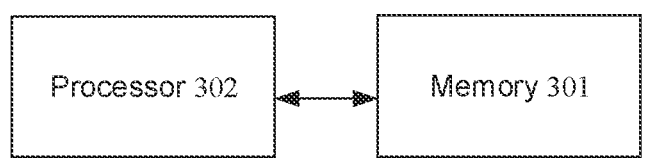
FIG. 4 is a structural diagram of a data processing device, in accordance with some embodiments.

In some embodiments, as shown in FIG. 4, the data processing device 300 includes a memory 301 and a processor 302. The memory 301 is coupled to the processor 302. For example, the processor is coupled to the memory through, for example, an input/output (I/O) interface, so as to realize information interaction.

The memory 301 stores thereon one or more computer programs that may be run on the processor 302.

The computer program(s), when executed by the processor 302, cause the data processing device 300 to implement the data processing method as described in any of the following embodiments.

For example, the processor 302 may be a single processor, or a general term of a plurality of processing elements. For example, the processor 302 may be a general-purpose central processing unit (CPU), a microprocessor, or an application specific integrated circuit (ASIC), or include one or more integrated circuits (such as one or more microprocessors) used for controlling execution of programs of the solutions of the present disclosure. For another example, the processor 302 may be a programmable device. For example, the programmable device is a complex programmable logic device (CPLD), an erasable programmable logic device (EPLD) or a field-programmable gate array (FPGA).

The memory 301 may be a single memory, or a general term of a plurality of storage elements, and is used for storing executable program codes, etc. Moreover, the memory 301 may include a random access memory or a non-volatile memory, such as a disk memory, or a flash memory.

The memory 301 is used for storing application program codes for implementing the solutions of the present disclosure, and the processor 320 controls the execution of the application program codes. The processor 302 is configured to execute the application program codes stored in the memory 301, so as to control the data processing device 300 to implement the data processing method as provided in any one of the following embodiments of the present disclosure.

Figure 5:
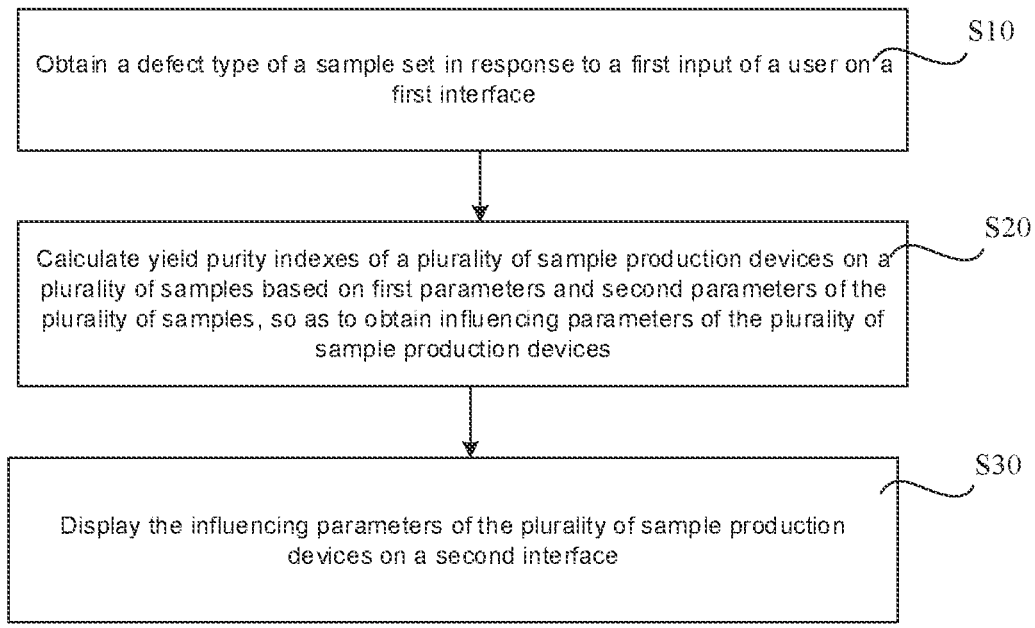
FIG. 5 is a flow diagram of a data processing method, in accordance with some embodiments.

Embodiments of the present disclosure provide a data processing method. For example, the data processing method may be applied to the electronic device, the data processing system, and the data processing device described above. As shown in FIG. 5, the data processing method includes steps S10 to S30.

In S10, a defect type of a sample set is obtained in response to a first input of a user on a first interface.

It will be noted that, the defect type is a defect type to be analyzed.

The sample set includes a plurality of samples. For example, the embodiments of the present disclosure may be used in a production line for display panels, for example, for determining a correlation between various processing equipments in the production line and the defect type in the production process of the display panels (such as liquid crystal display panels, organic light-emitting diode display panels). Of course, the embodiments of the present disclosure may also be applied to other products. For example, the sample includes a display panel motherboard (i.e., display panel glass). The display panel motherboard includes a plurality of display panels. For example, the display panel motherboard further includes a substrate, on which the plurality of display panels are disposed. For example, the substrate may include a rigid substrate such as a glass substrate, or a flexible substrate such as a polyimide (PI) substrate. The substrate may further include a buffer layer or other films that are disposed on the rigid substrate or the flexible substrate.

The "defect" herein refers to a quality defect of the sample, which may cause the sample to be degraded or even scrapped, and may also cause the sample to be reworked or repaired.

In some examples, defects may be classified into different types according to needs. For example, defects may be classified according to a direct influence that the defects have on a performance of the sample into, for example, a bright line defect, a dim line defect, a hot spot defect, etc.; or classified according to a specific cause of the defect into, for example, a signal line short circuit defect, an alignment defect, etc.; or classified according to a general cause of the defects into, for example, an array process defect, a color film process defect, etc.; or classified according to a severity of the defect into, for example, a defect leading to scrapping, a defect leading to lower quality, etc. Alternatively, the defects may not be classified. That is, as long as there is a defect in the sample, the sample is deemed to be defective; otherwise, it is deemed to be non-defective.

The defect type of the sample set is a single defect type. That is, the plurality of samples included in the sample set have a same defect type.

It will be noted that, the "correlation" mentioned herein is specific to "a single" defect type. That is, the same sample production device has different degrees of influence on different defect types. That is, the correlations between the same sample production device and different defect types are different. The correlation between the sample production device and a certain defect type refers to an influence degree in which a participation of the sample production device affects a probability of occurrence of the defect type on the samples.

Figure 6A:
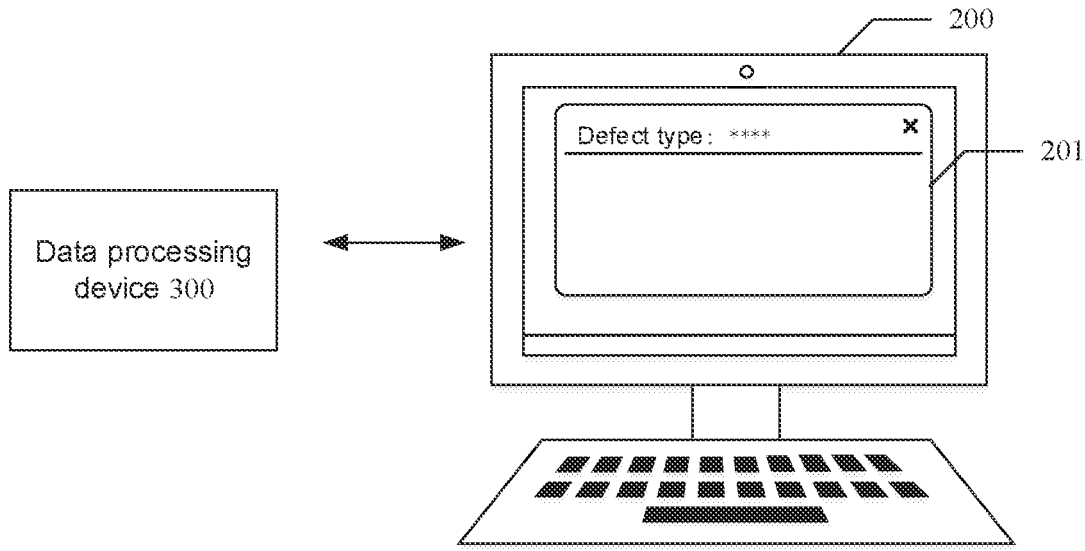
FIG. 6A is a process diagram of a data processing method, in accordance with some embodiments.
Figure 6B:
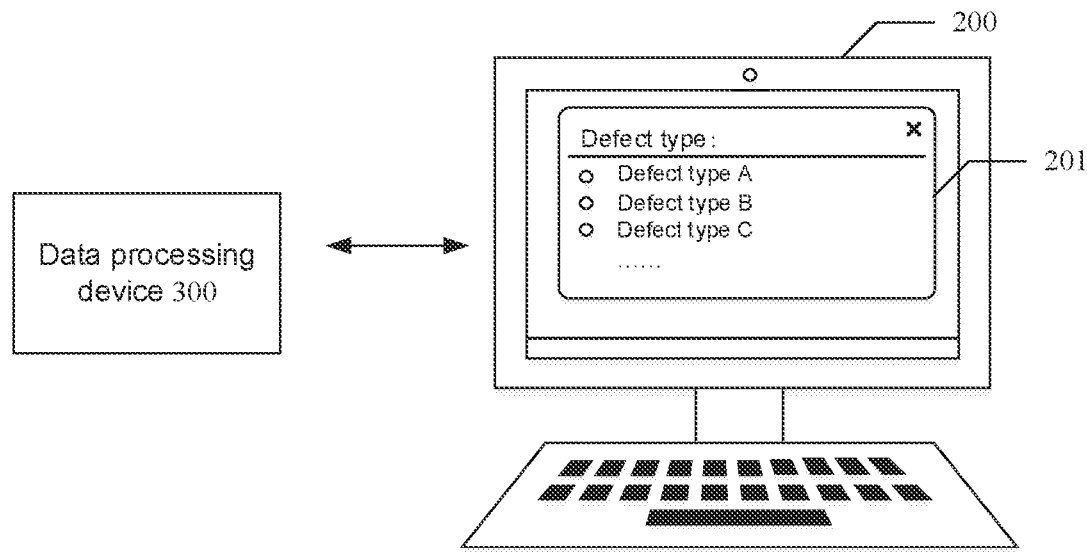
FIG. 6B is another process diagram of a data processing method, in accordance with some embodiments.

In some examples, referring to FIGS. 6A and 6B, the display device 200 displays the first interface 201. The user performs the first input on the first interface. The data processing device 300 determines the defect type of the sample set in response to the first input. For example, the first input is to input a single defect type, and the defect type is a defect type to be analyzed. For example, referring to FIG. 6A, a first input box may be displayed on the first interface 201, and the first input of the user on the first interface may be directly inputting the defect type in the first input box on the first interface, so as to determine the defect type of the sample set. For example, the electronic device or the data processing system may be pre-configured to have a database that includes a plurality of defect types. Referring to FIG. 6B, a first selection box may be displayed on the first interface 201, and the first selection box includes options of the plurality of defect types (such as the "Defect type A", "Defect type B" and "Defect type C" in FIG. 6B). The first input of the user on the first interface may be selecting from the options of the plurality of defect types, so as to determine the defect type of the sample set.

Each sample has a first parameter and a second parameter. The first parameter is used to represent a defect degree of the sample with regard to the defect type, and the second parameter is used to represent device informations of sample production devices through which the sample passes.

For example, the first parameter of the sample may represent that the sample is a non-defective sample or a defective sample for this defect type. For example, according to the first parameter of the sample, it may be determined whether the sample is a non-defective sample or a defective sample for the defect type. For example, as for the defect type of the sample set, the number of non-defective samples and the number of defective samples in the plurality of samples may be obtained according to first parameters of the plurality of samples in the sample set.

For example, the first parameter of the sample includes a defect degree representation value of the sample. For example, in a case where the sample is the display panel motherboard, a ratio of a total number of defective display panels, which belong to the defect type, in the plurality of display panels of the display panel motherboard to a total number of the plurality of display panels is used as the defect degree representation value in the first parameter of the sample, and the ratio may be referred to as a defective ratio of the samples; or, the total number of the defective display panels, which belong to the defect type, in the plurality of display panels of the display panel motherboard is used as the defect degree representation value in the first parameter of the sample. In this case, the larger the defect degree representation value in the first parameter of the sample, the greater the defect degree of the sample with regard to the defect type. For another example, in the case where the sample is a display panel motherboard, a ratio of a total number of display panels other than the defective display panels, which belong to the defect type, in the plurality of display panels of the display panel motherboard to the total number of the plurality of display panels is used as the defect degree representation value in the first parameter of the sample; or, the total number of display panels other than the defective display panels, which belong to the defect type, in the plurality of display panels of the display panel motherboard is used as the defect degree representation value in the first parameter of the sample. In this case, the smaller the defect degree representation value in the first parameter of the sample, the greater the defect degree of the sample with regard to the defect type.

It will be understood that, many products (such as display panels) are produced on production lines. Each production line includes a plurality of process stations. Each process station is used for performing a certain treatment (such as cleaning, deposition, exposure, etching, alignment, inspection) on the products (including semi-finished products). Meanwhile, each process station usually has a plurality of sample production devices (i.e., processing equipments) for performing the same treatment. Of course, although the treatment is theoretically the same, the actual treatment effects of different processing equipments are not exactly the same since the models, conditions, etc. thereof are different. In this case, each sample needs to pass through a plurality of process stations in the production process, and different samples may pass through different process stations in the production process. Moreover, samples that pass through the same process station may be processed by different sample production devices. Therefore, on a single production line, each sample production device will participate in the production processes of some of the samples, but not the production processes of all of the samples. That is, each sample production device participates in and only participates in the production processes of some of the samples.

For example, the second parameter may include names, models, or codes of the sample production devices through which the sample passes, and names of the process stations, production line, or factory in which the sample production devices are located, and a time at which the sample is processed by each sample production device. Each sample corresponds to a plurality of sample production devices, and there are a plurality of device informations of the plurality of sample production devices, through which the sample passes, represented by the second parameter of each sample.

In S20, yield purity indexes of the plurality of sample production devices on the plurality of samples are calculated based on first parameters and second parameters of the plurality of samples, so as to obtain influencing parameters of the plurality of sample production devices.

The influencing parameter of each sample production device is used to represent an influence degree to which the sample production device affects an occurrence of the defect type on the plurality of samples. The influencing parameter of each sample production device reflects a correlation between the sample production device and the occurrence of the defect type on the samples. For example, the larger the influencing parameter of the sample production device, the greater the influence degree to which the sample production device affects the occurrence of the defect type on the samples; or, the smaller the influencing parameter of the sample production device, the greater the influence degree to which the sample production device affects the occurrence of the defect type on the samples.

It will be understood that, purity index is used to represent an uncertainty of a random variable. In some embodiments of the present disclosure, the purity index may be represented by "information entropy". The smaller the information entropy, the higher the purity. The lower the purity, the higher the uncertainty of a feature, i.e., the less the influence degree to which the sample production device affects the occurrence of the defect type on the samples. The higher the purity, the lower the uncertainty of the feature, i.e., the greater the influence degree to which the sample production device affects the occurrence of the defect type on the samples. In some embodiments of the present disclosure, the purity index may also be represented by a Gini coefficient. The smaller the Gini coefficient, the higher the purity.

The yield purity index of the sample production device on the plurality of samples represents a purity of the sample production device on the occurrence of the defect type on the plurality of samples. For example, the lower the yield purity index of the sample production device, the higher the uncertainty of the sample production device on the occurrence of the defect type of the samples, and the less the influence degree to which the sample production device affects the occurrence of the defect type on the samples; the higher the yield purity index, the lower the uncertainty of the sample production device on the occurrence of the defect type of the samples, and the greater the influence degree to which the sample production device affects the occurrence of the defect type on the samples.

The influencing parameter of the sample production device is related to the yield purity index of the sample production device. For example, the influencing parameter of the sample production device may be represented by the yield purity index of the sample production device. For another example, the influencing parameter of the sample production device may be represented by a weight value that is obtained according to the yield purity index of the sample production device.

In the embodiments of the present disclosure, as for the process equipments or sample production devices through which the samples pass in the production processes, there is a need to locate an attribute that causes a defect type to occur on the sample during each process of the sample and in the large amount of data of the sample production device. That is, there is a need to sort bifurcation node attributes of a decision tree by the importance of the features. Therefore, in the embodiments of the present disclosure, with the plurality of sample production devices as features, the idea of the construction of a decision tree is used to sort the features based on the purity index.

It will be noted that, in the embodiments of the present disclosure, the decision tree is not directly used to perform the decision tree construction, and technical problems to be solved are not prediction problems that are to be solved by the decision tree. Instead, the idea of increasing the purity in the decision tree is combined with yield analysis to implement rapid location of the root causes that affect the defect degree based on the big data technology.

In some embodiments, the yield purity index includes at least one of an information gain, an information gain rate, and a Gini coefficient.

It will be understood that, the yield purity index may be obtained based on an algorithm of constructing the decision tree based on purity, such as at least one of an information gain algorithm (ID3 algorithm), an information gain rate algorithm (C4.5 algorithm) and a Gini index algorithm (classification and regression tree (CART) algorithm).

The ID3 algorithm calculates the information gain. Split may bring about an increase in the purity and a decrease in the information entropy. The calculation formula is subtracting information entropies of all child nodes (normalized) from an information entropy of a parent node, i.e., $$\text{Gain}(D, a) = \text{Entropy}(D) - \sum_{i=1}^{J} \frac{|D_i|}{|D|} \text{Entropy}(D_i),$$

where D is the parent node, $D_1$ is a child node, a in Gain (D, a) is a selected attribute of the D node, i is a category, J is a total number of categories, and Entropy (D) is an information entropy of the D node. For example, D may represent the sample production device, and a may represent an attribute that indicates the sample is non-defective or defective. By setting a node with the highest information gain as the parent node, a decision tree with a high purity may be obtained. The ID3 algorithm is relatively simple. The more features (i.e., the sample production devices) it is based on, the finer the split, the lower the uncertainty, and the higher the information gain.

The C4.5 algorithm calculates the information gain rate. The information gain rate is a ratio of the information gain to an attribute entropy. The attribute entropy is calculated according to a value of the attribute. For example, $$\text{Gain\_Ratio}(D, a) = \frac{\text{Gain } (D, a)}{IV(a)}, IV(a) = -\sum_{i=1}^{J} \frac{|D_i|}{|D|} \log_2 \frac{|D_i|}{|D|},$$

where Gain_Ratio (D, a) is the information gain rate. The C4.5 algorithm selects a threshold corresponding to a split with the highest information gain, and may perform discrete processing on continuous values.

The CART algorithm may reflect the uncertainty of the sample by calculating the Gini coefficient. As for a specific calculation process of the Gini coefficient, reference may be made to the description in a corresponding part below, which will not be repeated herein.

In S30, the influencing parameters of the plurality of sample production devices are displayed on a second interface.

Figure 7:
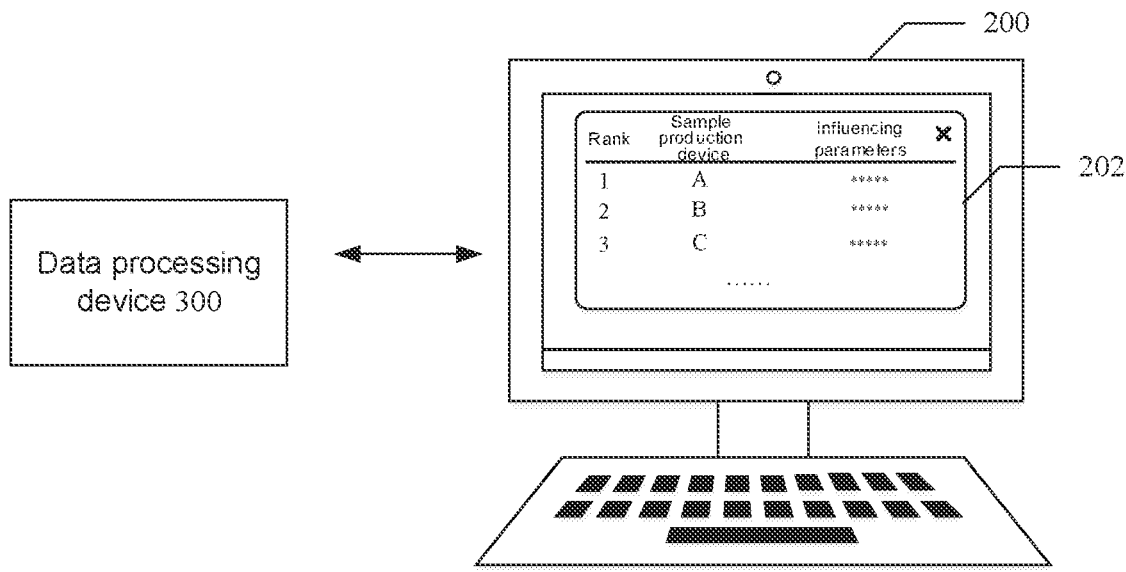
FIG. 7 is yet another process diagram of a data processing method, in accordance with some embodiments.

In some examples, when the data processing device 300 transmits the obtained influencing parameters of the plurality of sample production devices (such as sample production devices A, B and C) to the display device 200, referring to FIG. 7, the display device 200 displays the influencing parameters of the plurality of sample production devices on the second interface 202. The user may directly see the influencing parameters of the plurality of sample production devices on the second interface, thereby achieving human-computer interaction.

In this case, the user may find out the causes of the defect type of the samples according to a sample production device, which has a larger influence on the defect type of the samples, in the plurality of sample production devices. As such, the user may be able to conduct targeted inspection on some of the sample production devices, which saves labor costs and improves a defect inspection efficiency.

Therefore, in the data processing method provided in the embodiments of the present disclosure, a defect type of a sample set is obtained, the sample set including a plurality of samples, each sample having a first parameter and a second parameter; yield purity indexes of a plurality of sample production devices on the plurality of samples are calculated based on first parameters and second parameters of the plurality of samples, so as to obtain influencing parameters of the plurality of sample production devices; and the influencing parameters of the plurality of sample production devices are displayed on a second interface. In this case, drawing on the idea of decision tree construction, the plurality of sample production devices are deemed as features to analyze correlations between the plurality of sample production devices and the occurrence of the defect type on the sample based on the yield purity indexes, so as to obtain influence degrees to which the plurality of sample production devices affect the defect type of the sample. According to a sample production device, which has a large influence on the defect type of the samples, in the plurality of sample production devices, the user may find out the causes of the defect type of the samples and then rapidly locate the causes of the defect type. As such, targeted inspection may be conducted on some of the sample production devices, which saves labor costs and improves the defect inspection efficiency.

In addition, in the embodiments of the present disclosure, the distributed storage device may efficiently achieve collection and a preliminary processing of the raw data of the plurality of sample production devices through a big data method, and the data processing device may conveniently obtain required data from the distributed storage device, so as to calculate the influence degree to which the sample production device affects an occurrence of the defect type on the plurality of samples (i.e., a correlation between the sample production device and the defect type) for the display device to display. As a result, in the embodiments of the present disclosure, the causes of the defect of the samples may be automatically analyzed, so as to locate the defect type and adjust the production process.

Correspondingly, the electronic device, the data processing device and system provided in the embodiments of the present disclosure may determine the influence degree to which each sample production device in the production line affects the occurrence of the defect type on the plurality of samples (i.e., the correlation between the sample production device and the defect type); that is, the causes of the occurrence of the defect type on the samples may be determined, so as to locate the defect type and adjust the production process.

In some examples, the influencing parameters of the plurality of sample production devices displayed on the second interface are arranged in order from largest to smallest or from smallest to largest.

In this way, the user may directly see, on the second interface, a ranking of influence degrees to which the plurality of sample production devices affect the occurrence of the defect type on the plurality of samples, and obtain a sample production device that has a large influence degree, e.g., a sample production device corresponding to an influence parameter that ranks high, or a sample production device corresponding to an influence parameter that ranks low. Therefore, the user may quickly obtain sample production devices with a larger probability of causing a defect type on the samples, prioritize inspection and processing of these sample production devices, and locate the causes of the defect type of the samples. In this way, the inspection time may be shortened, labor costs may be saved, and the efficiency of data analysis and sample detection may be improved.

In some embodiments, the data processing method further includes: determining the plurality of sample production devices in response to a second input of the user on a third interface.

Figure 8A:
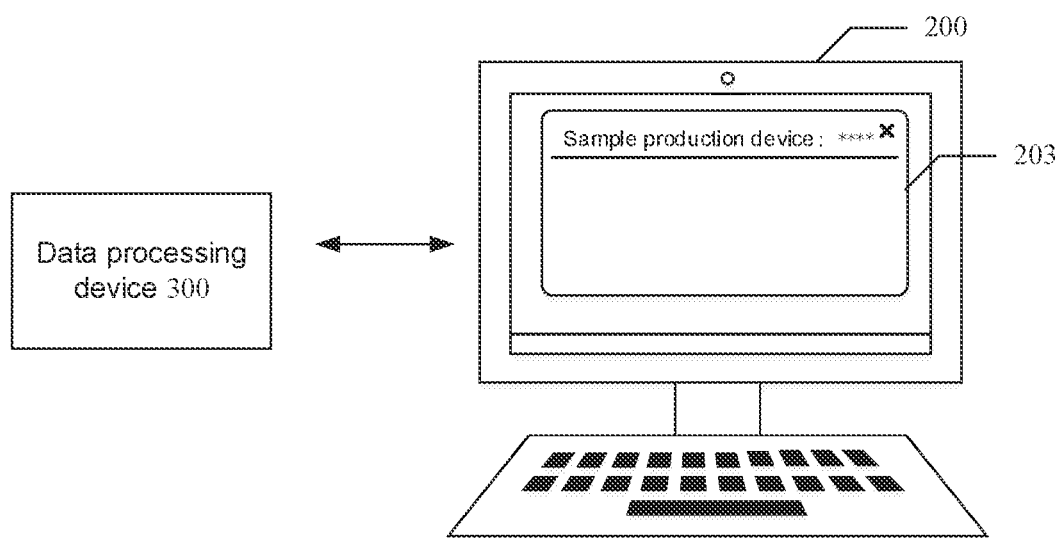
FIG. 8A is yet another process diagram of a data processing method, in accordance with some embodiments.
Figure 8B:
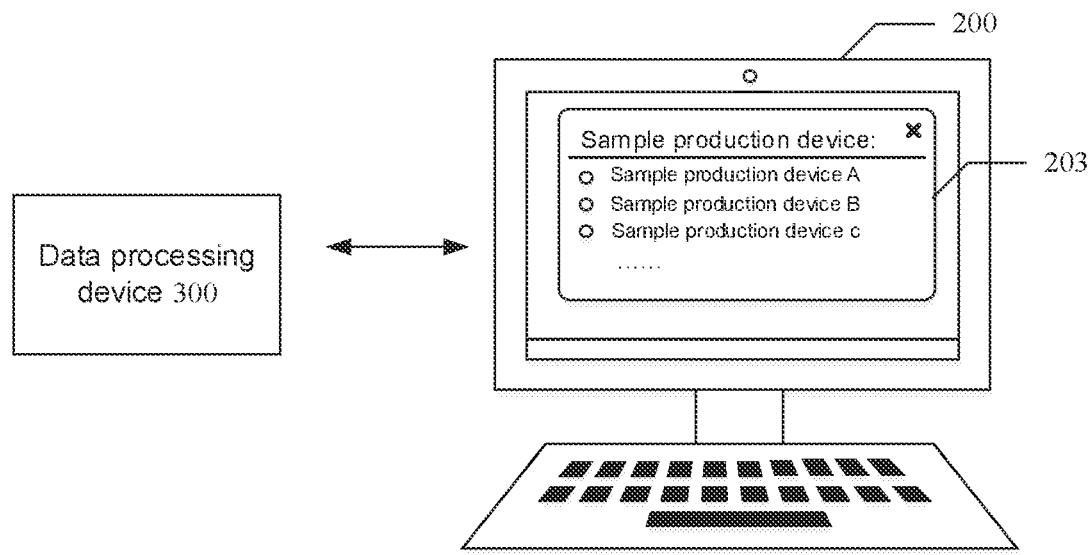
FIG. 8B is yet another process diagram of a data processing method, in accordance with some embodiments.

In some examples, referring to FIGS. 8A and 8B, the display device 200 displays the third interface 203, the user performs the second input on the third interface 203, and the data processing device 300 determines the plurality of sample production devices in response to the second input. For example, referring to FIG. 8A, a second input box may be displayed on the third interface 203, and the second input of the user on the third interface 203 may be directly inputting informations of the plurality of sample production devices into the second input box on the third interface 203, so as to determine the plurality of sample production devices. The informations of the plurality of sample production devices may be identification informations such as the names, models, or codes of the plurality of sample production devices. For example, the data processing system, electronic device, or data processing device may be pre-configured with a database including informations of a large number of sample production devices.

Referring to FIG. 8B, a second selection box may be displayed on the third interface 203, and the second selection box includes options of the sample production devices. The second input of the user on the third interface 203 may be selecting from the options of the sample production devices, so as to determine the plurality of sample production devices.

For example, the first interface and the third interface may be the same interface. For example, the user may perform the first input and the second input on a single interface. For example, a single interface may display the first input box or the first selection box for the user to perform the first input, or display the second input box or the second selection box for the user to perform the second input.

In this case, the plurality of sample production devices are screened according to the second input of the user, so as to obtain the influencing parameters of the plurality of sample production devices of concern to the user. In this way, the amount of data that needs to be processed is reduced, and the data processing efficiency may be improved.

In some embodiments, the first parameter of the sample includes the defect degree representation value of the sample.

In some examples, the data processing method further includes: determining a focus threshold in response to a third input of the user on a fourth interface; and dividing the plurality of samples into non-defective samples and defective samples according to defect degree representation values in the first parameters of the plurality of samples and the focus threshold.

Figure 9A:
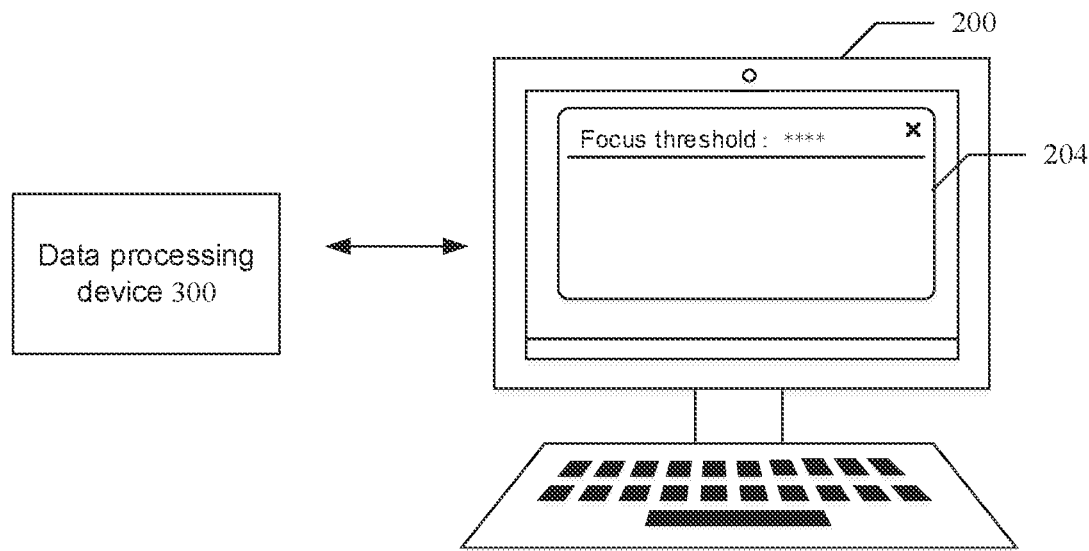
FIG. 9A is yet another process diagram of a data processing method, in accordance with some embodiments.
Figure 9B:
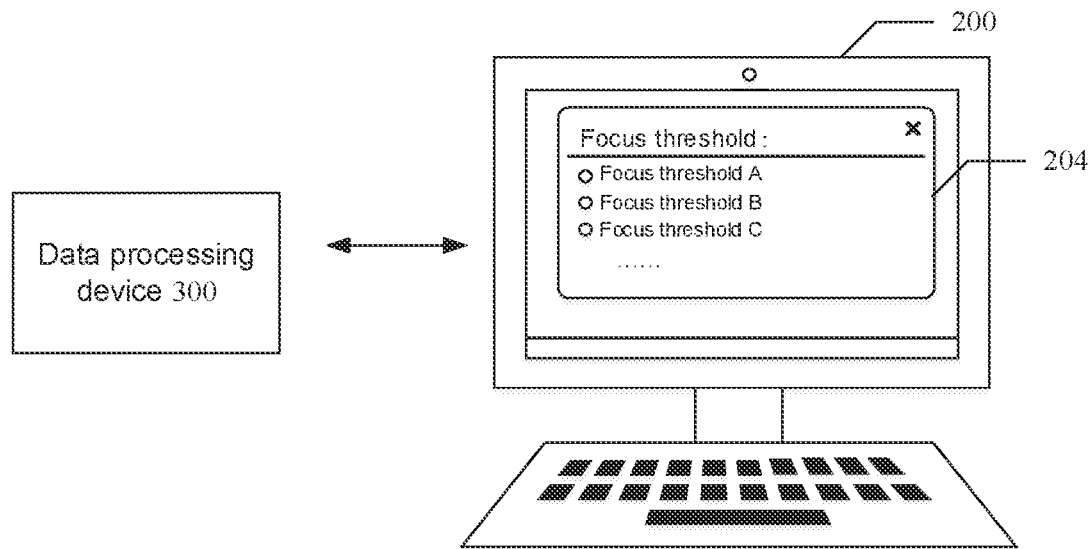
FIG. 9B is yet another process diagram of a data processing method, in accordance with some embodiments.

In some examples, referring to FIGS. 9A and 9B, the display device 200 displays the fourth interface 204, the user performs the third input on the fourth interface 204, and the data processing device 300 determines the focus threshold in response to the third input. For example, referring to FIG. 9A, a third input box may be displayed on the fourth interface 204, and the third input of the user on the fourth interface 204 may be directly inputting the focus threshold in the third input box on the fourth interface 204, so as to determine the focus threshold. Alternatively, for example, referring to FIG. 9B, the third selection box may be displayed on the fourth interface 204, and the third selection box includes options of a plurality of focus thresholds. The third input of the user on the fourth interface 204 may be selecting a focus threshold in the third selection box on the fourth interface 204, so as to determine the focus threshold.

It will be noted that, according to actual situations, the user may select a single defect degree representation value in the defect degree representation values in the first parameters of the plurality of samples as the focus threshold. The focus threshold may be selected within a range between a maximum value and a minimum value of the defect degree representation values in the first parameters of the plurality of samples. For example, an average value of the defect degree representation values in the first parameters of the plurality of samples is selected as the focus threshold.

For example, in a case where the larger the defect degree representation value in the first parameter of the sample, the greater the defect degree of the sample with regard to the defect type, a sample with a first parameter, in which a defect degree representation value is less than the focus threshold, is a non-defective sample, and a sample with a first parameter, in which a defect degree representation value is greater than or equal to the focus threshold, is a defective sample; or, a sample with a first parameter, in which a defect degree representation value is less than or equal to the focus threshold, is a non-defective sample, and a sample with a first parameter, in which a defect degree representation value is greater than the focus threshold, is a defective sample. For another example, in a case where the smaller the defect degree representation value in the first parameter of the sample, the greater the defect degree of the sample with regard to the defect type, a sample with a first parameter, in which a defect degree representation value is greater than the focus threshold, is a non-defective sample, and a sample with a first parameter, in which a defect degree representation value is less than or equal to the focus threshold is a defective sample; or, a sample with a first parameter, in which a defect degree representation value is greater than or equal to the focus threshold, is a non-defective sample, and a sample with a first parameter, in which a defect degree representation value is less than the focus threshold, is a defective sample.

For another example, the data processing method further includes: obtaining a focus threshold according to the defect degree representation values in the first parameters of the plurality of samples; and dividing the plurality of samples into non-defective samples and defective samples according to the defect degree representation values in the first parameters of the plurality of samples and the focus threshold.

For example, obtaining the focus threshold according to the defect degree representation values in the first parameters of the plurality of samples, includes steps 401 to 406 (S401 to S406).

In S401, an initial array is divided into a first array and a second array according to a first index.

The initial array includes the defect degree representation values in the first parameters of the plurality of samples that are sequentially arranged in order of size. For example, the defect degree representation values in the first parameters of the plurality of samples included in the initial array are arranged in order from smallest to largest; or, the defect degree representation values in the first parameters of the plurality of samples included in the initial array are arranged in order from largest to smallest.

The first index is used to indicate a division position in the initial array. For example, in the initial array, the number of the defect degree representation values in the first parameters is n, the first index is m; n is an integer greater than 1, and m is a positive integer less than n. In this case, the first array includes defect degree representation values in the 1st to the m-th first parameters in the initial array, and the second array includes defect degree representation values in the (m+1)-th to the n-th first parameters in the initial array. Alternatively, the first array includes defect degree representation values in the 1st to the (m−1)-th first parameters in the initial array, and the second array includes defect degree representation values in the m-th to the n-th first parameters in the initial array.

In some examples, in a case where the number of the defect degree representation values in the first parameters of the plurality of samples in the initial array is even, the first index is one-half of a value of the number of the defect degree representation values in the first parameters of the plurality of samples in the initial array or an integer that is obtained by subtracting one from one-half of the value. For example, in a case where the number of the defect degree representation values in the first parameters of the plurality of samples in the initial array is 50, one-half of the number of the defect degree representation values in the first parameters of the plurality of samples is 25, and then the first index is 25; or, a value obtained by subtracting one from one-half of the number of the defect degree representation values in the first parameters of the plurality of samples is 24, and then the first index is 24.

In a case where the number of the defect degree representation values in the first parameters of the plurality of samples in the initial array is odd, the first index is an integer obtained by rounding up or rounding down one-half of the value of the number of the defect degree representation values in the first parameters of the plurality of samples in the initial array; or, the first index is an integer obtained by rounding up or rounding down a value that is obtained by subtracting one from one-half of the value of the number of the defect degree representation values in the first parameters of the plurality of samples in the initial array. For example, in a case where the number of the defect degree representation values in the first parameters of the plurality of samples in the initial array is 49, one-half of the number of the defect degree representation values in the first parameters of the plurality of samples is 24.5, and then the first index is 24 or 25; or, a value obtained by subtracting one from one-half of the value of the number of the defect degree representation values in the first parameters of the plurality of samples is 23.5, and then the first index is 23 or 24.

In S402, a first average value of all elements in the first array and a second average value of all elements in the second array are obtained.

In S403, a third array and a fourth array are generated.

The third array is composed of deviation degrees of all the elements of the initial array compared with the first average value, and the fourth array is composed of deviation degrees of all the elements of the initial array compared with the second average value. For example, the deviation degrees may be absolute values of differences between elements of the initial array and an average value, or may be variances of elements of the initial array compared with the average value.

In S404, a second index is determined.

The second index is used to indicate a position at which a positive-negative inversion occurs in differences between all the elements in the third array and corresponding elements in the fourth array. For example, in a case where the defect degree representation values in the first parameters in the initial array are arranged in order from smallest to largest, the number of the defect degree representation values in the first parameters in the initial array is N, an i-th element in the third array is smaller than an i-th element in the fourth array, and an (i+1)-th element in the third array is greater than an (i+1)-th element in the fourth array; in a case where the defect degree representation values in the first parameters in the initial array are arranged in order from largest to smallest, the i-th element in the third array is greater than the i-th element in the fourth array, and the (i+1)-th element in the third array is smaller than the (i+1)-th element in the fourth array; i is a positive integer less than or equal to N. In this case, a position corresponding to the second index is a position of the i-th element or the (i+1)-th element.

In S405, the first index is updated to the second index if the second index is not equal to the first index, and steps S401 to S404 are repeated until the first index is equal to the second index.

For example, it is determined whether the second index is equal to the first index; if no, the first index is updated to the second index, and steps S401 to S404 are repeated; if yes, the first index is equal to the second index, and S406 is executed.

In S406, an average value of two adjacent elements in the first array and the second array corresponding to the first index is calculated as the focus threshold.

For example, in the case where the defect degree representation values in the first parameters in the initial array are arranged in order from smallest to largest, the initial array is [0, 0, 0, 0, 1, 1, 2], and the first index is 4, which corresponds to a 5-th element in the initial array, and then the first array is [0, 0, 0, 0], and the second array is [1, 1, 2]. In this case, the first average value is 0, and the second average value is 4/3. In a case where the deviation degrees are the absolute values of the differences between the elements of the initial array and the average value, the third array is [0, 0, 0, 0, 1, 1, 2], and the fourth array is [4/3, 4/3, 4/3, 4/3, 1/3, 1/3, 2/3]. In this case, each element in the third array is compared with a respective element in the fourth array. For example, differences between the elements in the third array and the respective elements in the fourth array are [−4/3, −4/3, −4/3, −4/3, 2/3, 2/3, 4/3]. The positive-negative inversion occurs in the differences between fourth elements and between fifth elements in the third array and the fourth array. That is, the fourth element in the third array is greater than the fourth element in the fourth array, and the fifth element in the third array is less than the fifth element in the fourth array. In this case, the second index may be 4. Since the first index is equal to the second index, the first index is also 4. Therefore, the first index corresponds to the 5-th element in the initial array, a first array [0, 0, 0, 0] and a second array [1, 1, 2] are obtained after division, and the adjacent two elements are respectively the fifth element and the fourth element in the initial array, i.e., 1 and 0. An average value of the two elements is 1/2, and the focus threshold is 1/2, i.e., 0.5.

In some embodiments, the data processing method further includes: yield statistical data of the plurality of samples, or yield statistical data of the plurality of samples that pass through the sample production devices, or yield statistical data of the plurality of samples and yield statistical data of the plurality of samples that pass through the sample production devices are obtained according to the first parameters and second parameters of the plurality of samples; and influencing parameters of the sample production devices are obtained according to the yield statistical data of the plurality of samples, or the yield statistical data of the plurality of samples that pass through the sample production devices, or the yield statistical data of the plurality of samples and the yield statistical data of the plurality of samples that pass through the sample production devices.

For example, the yield statistical data of the plurality of samples includes: the total number of the plurality of samples, the total number of non-defective samples in the plurality of samples, and the total number of defective samples in the plurality of samples. The yield statistical data of the plurality of samples that pass through the sample production devices includes: for each sample production device, the total number of samples, which pass through the sample production device, in the plurality of samples, the total number of non-defective samples, which pass through the sample production device, in the plurality of samples, and the total number of defective samples, which pass through the sample production device, in the plurality of samples.

In some examples, obtaining the influencing parameters of the sample production devices according to the yield statistical data of the plurality of samples and the yield statistical data of the plurality of samples that pass through the sample production devices, includes: calculating a Gini coefficient of each sample production device. The Gini coefficient of the sample production device satisfies a formula:

$$G = \frac{S_1}{T_1} \times \left[1 - \left(\frac{S_2}{S_1}\right)^2 - \left(\frac{S_3}{S_1}\right)^2\right] + \frac{T_1 - S_1}{T_1} \times \left[1 - \left(\frac{T_2 - S_2}{T_1 - S_1}\right)^2 - \left(\frac{T_3 - S_3}{T_1 - S_1}\right)^2\right].$$

Where G represents the Gini coefficient of the sample production device, $S_1$ represents the total number of the samples, which pass through the sample production device, in the plurality of samples, $T_1$ represents the total number of the plurality of samples, $S_2$ represents the total number of the defective samples, which pass through the sample production device, in the plurality of samples, $T_2$ represents the total number of the defective samples in the plurality of samples, $S_3$ represents the total number of the non-defective samples, which pass through the sample production device, in the plurality of samples, and $T_3$ represents the total number of the non-defective samples in the plurality of samples.

It will be understood that, $(T_1-S_1)$ represents the total number of samples, which do not pass through the sample production device, in the plurality of samples; $(T_2-S_2)$ represents the total number of defective samples, which do not pass through the sample production device, in the plurality of samples; and $(T_3-S_3)$ represents the total number of non-defective samples, which do not pass through the sample production device, in the plurality of samples.

The larger the Gini coefficient of the sample production device, the less the influence degree to which the sample production device affects the occurrence of the defect type on the plurality of samples. For example, the Gini coefficients of the sample production devices are displayed on the first interface. For example, the Gini coefficients of the sample production devices are arranged in order from smallest to largest. The larger the Gini coefficient, the lower the uncertainty of the occurrence of the defect type on the samples produced by the sample production device.

It will be understood that, in the CART algorithm of the decision tree, the Gini coefficient is used to calculate an influence degree and importance of each feature on an entire sample set. The larger the Gini coefficient, the higher the uncertainty of the feature, i.e., the less the influence degree to which the sample production device affects the occurrence of the defect type on the plurality of samples. The smaller the Gini coefficient, the lower the uncertainty of the feature, i.e., the greater the influence degree to which the sample production device affects the occurrence of the defect type on the plurality of samples.

For example, obtaining the influencing parameters of the sample production devices according to the yield statistical data of the plurality of samples and the yield statistical data of the plurality of samples that pass through the sample production device, further includes: for each sample production device, calculating a chi-square distribution of samples, which pass through the sample production device, in the plurality of samples.

The chi-square distribution satisfies a formula:

$$V = \begin{cases} \dfrac{K^{(Z/2-1)}e^{-K/2}}{2^{Z/2}\Gamma\left(\dfrac{Z}{2}\right)}, K > 0; \\ 0, K \leq 0 \end{cases},$$

where V represents the chi-square distribution of the samples, which pass through the sample production device, in the plurality of samples, Z represents a coefficient, and K represents a chi-square value of the plurality of samples for the sample production device, and $$\Gamma\left(\frac{Z}{2}\right)$$

is a gamma distribution function.

For example, the coefficient Z is equal to one, i.e., Z=1. For example, the coefficient Z may represent a degree of freedom. As for a binary classification tree, the degree of freedom Z satisfies a following formula: Z=2−1=1.

It will be understood that, a chi-square test is to calculate a deviation degree between an actual value and a theoretical value of a statistical sample, and the deviation degree between the actual value and the theoretical value determines the chi-square value. The most basic idea of the chi-square test is to determine whether the theory is correct or not by observing a deviation between the actual value and the theoretical value.

For example, assuming that the sample production device has nothing to do with the occurrence of the defect type on the samples that pass through the sample production device, i.e., the sample production device and the defective samples are independent of and unrelated to each other, then the theoretical value may be calculated according to a defective ratio $R_1$ and a non-defective ratio $R_2$ of the plurality of samples. The defective ratio $R_1$ of the plurality of samples is a ratio of the total number $T_2$ of the defective samples in the plurality of samples to the total number $T_1$ of the plurality of samples, i.e., $R_1=T_2/T_1$; and the non-defective ratio $R_2$ of the plurality of samples is the total number $T_3$ of the non-defective samples in the plurality of samples to the total number $T_1$ of the plurality of samples, i.e., $R_2=T_3/T_1$. In this case, a theoretical value $W_1$ of the total number of the defective samples, which pass through the sample production device, in the plurality of samples is a product of the total number $S_1$ of the samples, which pass through the sample production device, in the plurality of samples and the defective ratio $R_1$ of the plurality of samples, i.e., $W_1=S_1\times R_1$; a theoretical value $W_2$ of the total number of the non-defective samples, which pass through the sample production device, in the plurality of samples is a product of the total number $S_1$ of the samples, which pass through the sample production device, in the plurality of samples and the non-defective ratio $R_2$ of the plurality of samples, i.e., $W_2=S_1\times R_2$; a theoretical value $W_3$ of the total number of defective samples, which do not pass through the sample production device, in the plurality of samples is a product of the total number $(T_1-S_1)$ of the samples, which do not pass through the sample production device, in the plurality of samples and the defective ratio $R_1$ of the plurality of samples, i.e., $W_3=(T_1-S_1)\times R_1$; and a theoretical value $W_4$ of the total number of the non-defective samples, which do not pass through the sample production device, in the plurality of samples is a product of the total number $(T_1-S_1)$ of the samples, which do not pass through the sample production device, in the plurality of samples and the non-defective ratio $R_2$ of the plurality of samples, i.e., $W_4=(T_1-S_1)\times R_2$. In this case, the chi-square value K of the plurality of samples for the sample production device satisfies an equation: $K=[(S_2-W_1)^2/W_1]+[(S_3-W_2)^2/W_2]+[(T_2-S_2-W_3)^2/W_3]+[(T_3-S_3-W_4)^2/W_4]$.

According to the chi-square value corresponding to each sample production device, it may be possible to obtain the deviation degree between the actual value and the theoretical value of the defective samples, which pass through the sample production device, in the plurality of samples. The larger the chi-square value corresponding to the sample production device, the larger the deviation degree between the actual value and the theoretical value, and the more inconsistent the assumption is with reality. That is, the sample production device has an influence on the occurrence of the defect type on the samples, and the influence degree is relatively large. The smaller the chi-square value corresponding to the sample production device, the smaller the deviation degree between the actual value and the theoretical value, and the more consistent the assumption is with reality. That is, the sample production device substantially has nothing to do with the occurrence of the defect type on the samples, and the influence degree is relatively small. In a case where the chi-square value corresponding to the sample production device is 0, the theoretical value is equal to the actual value, which indicates that the assumption is consistent with reality. That is, the sample production device has absolutely nothing to do with the occurrence of the defect type on the samples.

In this case, the chi-square distribution is calculated to determine a reliability of the assumption (i.e., the assumption that the sample production device has nothing to do with the occurrence of the defect type on the samples); and under a premise that the assumption is true, a probability of an occurrence of sample results (i.e., the defect type on the samples) is obtained. That is, the assumption is tested. For example, in a case where V is less than 0.05 or less than 0.01 (i.e., V<0.05 or V<0.01), passing through the sample production device has a significant impact on a probability of the occurrence of the defect type on the samples; therefore, the assumption is not true, which also proves that the sample production device is related to the occurrence of the defect type on the samples.

In some examples, obtaining the influencing parameters of the sample production devices according to the yield statistical data of the plurality of samples and the yield statistical data of the plurality of samples that pass through the sample production devices, further includes: for each sample production device, obtaining a weight value of the sample production device according to the Gini coefficient of the sample production device and the chi-square distribution of the samples, which pass through the sample production device, in the plurality of samples, or a ratio of the total number of the defective samples, which pass through the sample production device, in the plurality of samples to the total number of the defective samples in the plurality of samples, or the Gini coefficient of the sample production device and the chi-square distribution of the samples, which pass through the sample production device, in the plurality of samples, and a ratio of the total number of the defective samples, which pass through the sample production device, in the plurality of samples to the total number of the defective samples in the plurality of samples.

The larger the weight value of the sample production device, the greater the influence degree to which the sample production device affects the occurrence of the defect type on the plurality of samples. For example, the weight values of the sample production devices are displayed on the second interface. For example, the weight values of the sample production devices are arranged in order from largest to smallest.

In some examples, obtaining the weight value of the sample production device according to the Gini coefficient of the sample production device and the chi-square distribution of the samples, which pass through the sample production device, in the plurality of samples, and the ratio of the total number of the defective samples, which pass through the sample production device, in the plurality of samples to the total number of the defective samples in the plurality of samples, includes: obtaining the weight value of the sample production device according to a formula:

$$Q = A \times (1-V)^{\frac{1}{\sqrt{G}}} + B \times G - C \times (1-F)^2.$$

Where Q is the weight value of the sample production device, and A, B, and C are all scale factors; V is the chi-square distribution of the samples, which pass through the sample production device, in the plurality of samples, G is the Gini coefficient of the sample production device, and F is the ratio of the total number of the defective samples, which pass through the sample production device, in the plurality of samples to the total number of the defective samples in the plurality of samples.

For example, the scale factor A is in a range of 0.9 to 1; for example, the scale factor A is 0.89, 0.9 or 0.99. For example, the scale factor B is in a range of 0 to 0.1; for example, the scale factor B is 0.01, 0.15 or 0.02. For example, the scale factor C is in a range of 0 to 0.2; for example, the scale factor C is 0.1, 0.15 or 0.19. For example, A+B=1. For example, the weight value of the sample production device is in a range of 0 to 1.0.

In addition, a first ratio, a second ratio, a third ratio, and a fourth ratio may also be displayed on an interface for displaying the influencing parameters. In this way, the user may obtain the influence degree to which the sample production device affects the occurrence of the defect type on the samples according to the first ratio, the second ratio, the third ratio, and the fourth ratio.

For example, as for a single process station, the process station corresponds to multiple sample production devices, and the above ratios may be used to reflect influence degrees to which the multiple sample production devices affect the occurrence of the defect type on the plurality of samples. The first ratio is a ratio of the total number of samples, which pass through the multiple sample production devices corresponding to the process station, in the plurality of samples to the total number of the plurality of samples. The first ratio reflects a ratio of the defective samples, which participate in the multiple sample production devices in the process station, in the plurality of samples to the plurality of samples. The larger the first ratio, the greater the influence degree to which the process station affects the occurrence of the defect type on the plurality of samples. The second ratio is a ratio of the total number of the defective samples, which pass through a sample production device, in the plurality of samples to the total number of the samples, which pass through the sample production device, in the plurality of samples. The second ratio reflects a ratio of the occurrence of the defect type on the samples that are produced by the sample production device. The larger the second ratio, the greater the influence degree to which the sample production device affects the occurrence of the defect type on the plurality of samples. The third ratio is a ratio of the total number of the defective samples, which pass through the sample production device, in the plurality of samples to the total number of defective samples, which pass through the sample production devices corresponding to the process station, in the plurality of samples. The third ratio reflects a ratio of the samples, which pass through the sample production device, in the defective samples that pass through the process station. The larger the third ratio, the greater the influence degree to which the sample production device affects the occurrence of the defect type on the plurality of samples. The fourth ratio is multiple of the second ratio relative to a fifth ratio, i.e., a ratio of the second ratio to the fifth ratio. The fifth ratio is a ratio of the total number of the defective samples in the plurality of samples to the total number of the plurality of samples. The fourth ratio reflects a ratio of a defective ratio of samples produced by the sample production device to a defective ratio of all samples. The larger the fourth ratio, the greater the influence degree to which the sample production device affects the occurrence of the defect type on the plurality of samples.

In some embodiments, the data processing method further includes: displaying a distribution diagram of the first parameters of the plurality of samples on a fifth interface. For example, referring to FIGS. 10A and 10B, the distribution diagram may be a histogram, a scatter graph, etc.

Figure 10A:
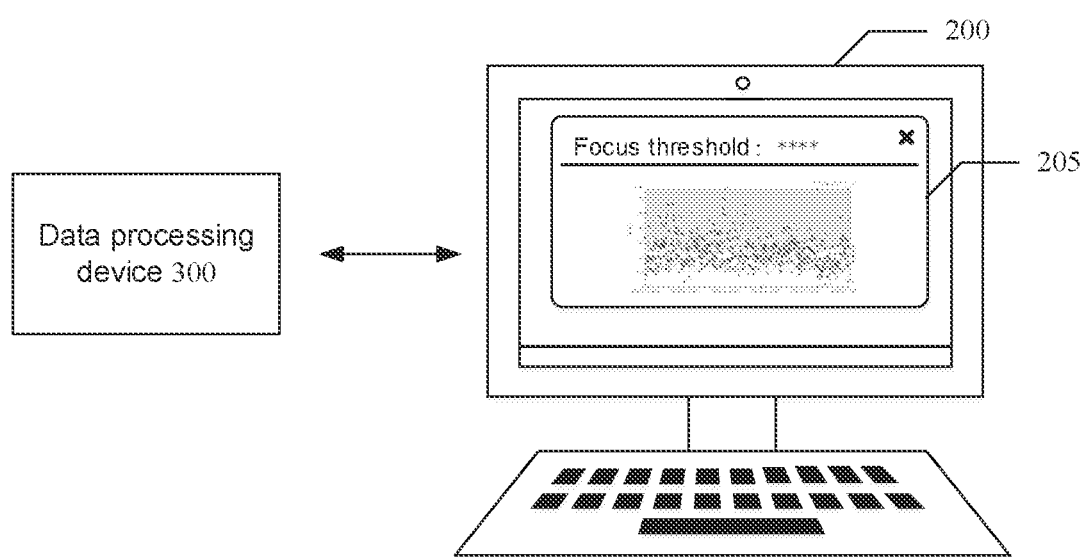
FIG. 10A is yet another process diagram of a data processing method, in accordance with some embodiments.

For example, referring to FIG. 10A, the display device 200 displays the fifth interface, so as to display the distribution diagram of the first parameters (for example, the defect degree representation values in the first parameters) of the plurality of samples on the fifth interface. In this way, the user may directly see the distribution of non-defective samples and defective samples in the plurality of samples. For example, the focus threshold may be set according to the distribution of the non-defective samples and the defective samples.

In some examples, the fifth interface and the first interface may be the same interface. For example, after the user performs the first input on the first interface, the plurality of samples are obtained, and after the plurality of samples are divided into the non-defective samples and the defective samples, a distribution diagram of the non-defective samples and the defective samples in the plurality of samples are displayed on the first interface.

Figure 10B:
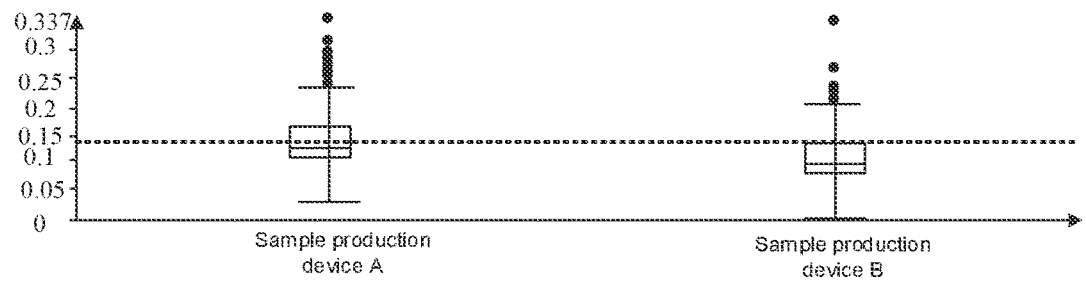
FIG. 10B is a distribution diagram of non-defective samples and defective samples in a plurality of samples, in accordance with some embodiments.
Figure 10B:
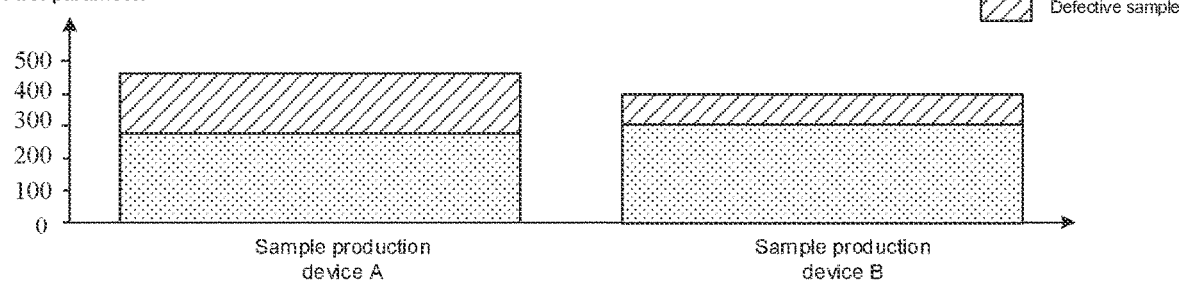
Figure 10B:
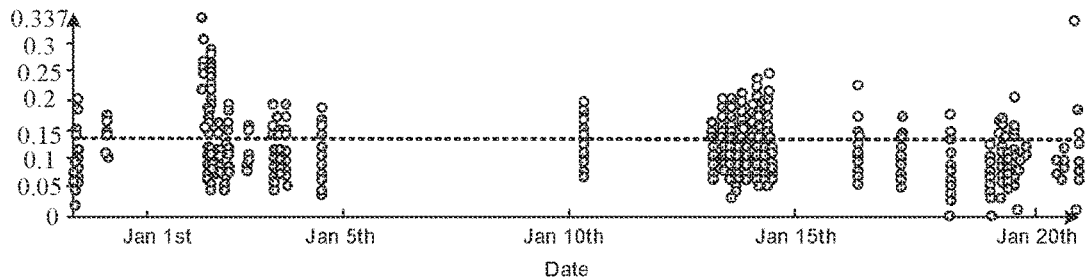

For another example, parts (A) and (B) in FIG. 10B are distribution diagrams of the first parameters of the samples passing through the sample production device. For example, the first parameters include the defect degree representation values. In part (A), the defect degree representation value in the first parameter is a defective ratio of the sample (e.g., in the case where the sample is the display panel motherboard, a defective ratio of the sample is a ratio of a total number of defective display panels in the display panel motherboard to a total number of all display panels); the denser the scattered points in part (A), the more defective samples there are. In part (B), the defect degree representation value in the first parameter is the defect count of the sample (e.g., in the case where the sample is the display panel motherboard, the defect count of the sample is a total number of defective display panels in the display panel motherboard). A sample production device A is one of the plurality of sample production devices that have been analyzed. A sample production device B is taken as a reference. The sample production device B and the sample production device A belong to a same process station. That is, the sample production device B and the sample production device A correspond to a same process. It will be seen that the number of defective samples, which pass through the sample production device A, is relatively large, and the sample production device A has a large influence on the occurrence of the defect type on the samples. Part (C) in FIG. 10B shows a distribution diagram of the first parameters of the plurality of samples according to production times of different sample production devices. In part (C), the scattered points above the dotted line represent defective samples, and the scattered points below the dotted line represent non-defective samples. Times at which the first parameters of the samples are distributed densely can be seen from the figure. The more densely the scattered points are distributed, the greater the influence degree to which the sample production device affects the occurrence of the defect type on the samples.

In some examples, the fifth interface and the third interface may be the same interface. For example, after the user performs the second input on the third interface, a distribution diagram corresponding to the non-defective samples and the defective samples obtained after dividing the plurality of samples are displayed on the second interface. In some examples, the fifth interface and the fourth interface may be the same interface. For example, after the user performs the third input on the fourth interface, the focus threshold is obtained. And according to the focus threshold and the first parameters of the plurality of samples, a distribution diagram corresponding to the non-defective samples and the defective samples obtained after dividing the plurality of samples are displayed on the fourth interface.

In some embodiments, the data processing method further includes: creating the sample set in response to a fourth input of the user on a sixth interface.

For example, the fourth input of the user on the sixth interface includes: inputting out-of-factory times of the samples, detection times of the samples, informations of the sample detection devices, models of the samples, etc.

Figure 11:
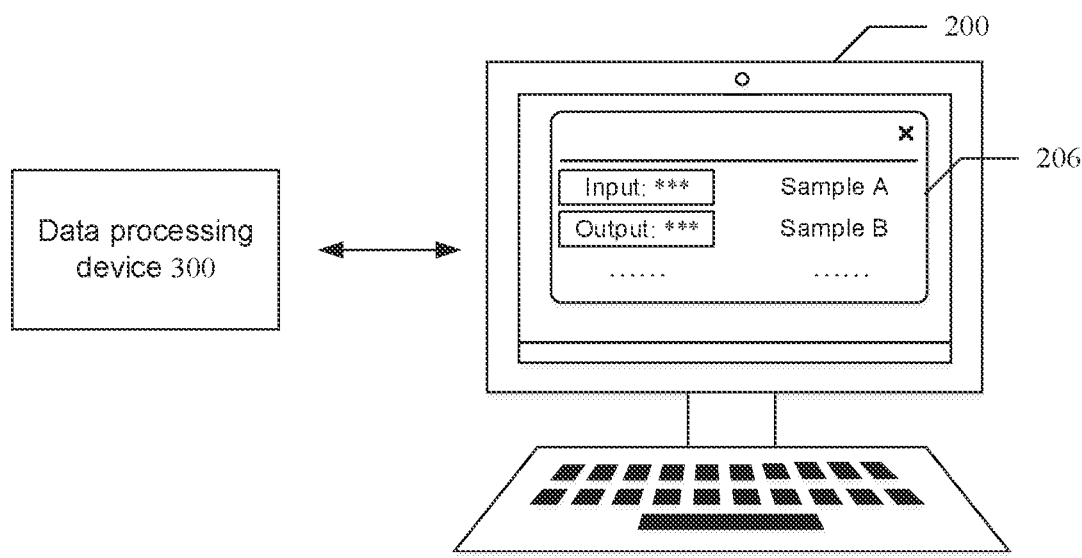
FIG. 11 is yet another process diagram of a data processing method, in accordance with some embodiments.

For example, referring to FIG. 11, the display device 200 displays the sixth interface 206. A fourth input box may be displayed on the sixth interface 206, and the fourth input of the user on the sixth interface 206 may be directly inputting informations corresponding to the plurality of samples, e.g., the informations of the sample detection devices, into the fourth input box on the sixth interface 206, so as to create the sample set. Alternatively, for example, a fourth selection box may be displayed on the sixth interface, and the fourth selection box includes a plurality of options. The fourth input of the user on the sixth interface may be selecting informations corresponding to the plurality of samples in the fourth selection box on the sixth interface, so as to create the sample set. In some examples, the created sample set may also be displayed on the sixth interface. That is, the plurality of samples are displayed on the sixth interface.

It will be understood that, an electronic device or a data processing system in which the data processing device is located may be pre-configured with a sample database and a sample production device database, so that the user may directly select data in the databases for processing during data processing.

For example, the sixth interface may be displayed before the first interface; or, the sixth interface and the first interface may be the same interface.

For example, the first interface, the second interface, the third interface, the fourth interface, the fifth interface, and the sixth interface may all be the same interface.

Figure 12:
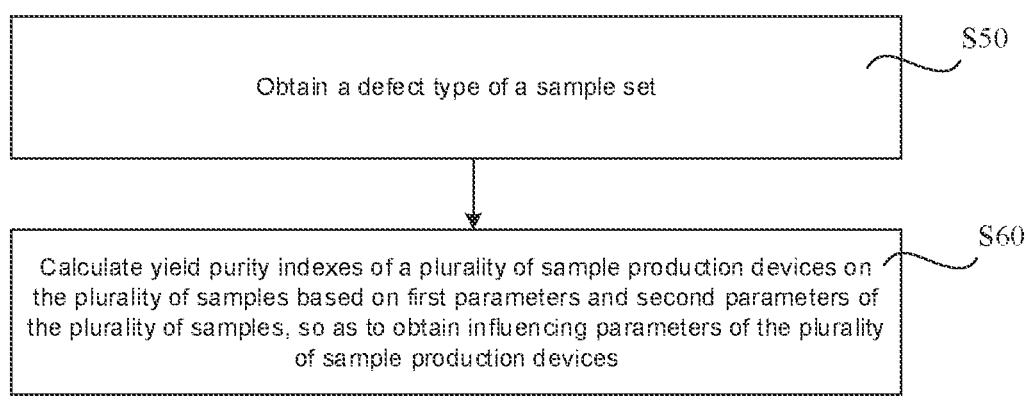
FIG. 12 is another flow diagram of a data processing method, in accordance with some embodiments.

Embodiments of the present disclosure provide a data processing method which, referring to FIG. 12, includes steps 50 to 60 (S50 to S60).

In S50, a defect type of a sample set is obtained.

The sample set includes a plurality of samples. Each sample has a first parameter and a second parameter. The first parameter is used to represent a defect degree of the sample with regard to the defect type, and the second parameter is used to represent device informations of sample production devices through which the sample passes.

In S60, yield purity indexes of a plurality of sample production devices on the plurality of samples is calculated based on first parameters and second parameters of the plurality of samples, so as to obtain influencing parameters of the plurality of sample production devices.

The influencing parameter of each sample production device is used to represent an influence degree to which the sample production device affects an occurrence of the defect type on the plurality of samples.

It will be noted that, as for specific descriptions of the defect type of the sample set, the first parameter, the second parameter, the yield purity index, the influencing parameter, etc., reference may be made to corresponding descriptions above, and details will not be repeated here.

Therefore, embodiments of the present disclosure provide a data processing method, which includes: obtaining a defect type of a sample set, the sample set including a plurality of samples, each sample having a first parameter and a second parameter; calculating yield purity indexes of a plurality of sample production devices on the plurality of samples based on first parameters and second parameters of the plurality of samples, so as to obtain influencing parameters of the plurality of sample production devices. In this case, drawing on the idea of decision tree construction, the plurality of sample production devices are deemed as features to analyze correlations between the plurality of sample production devices and the occurrence of the defect type on the samples based on the yield purity indexes, so as to obtain influence degrees to which the plurality of sample production devices affect the occurrence of the defect type of the samples. According to a sample production device, which has a larger influence on the defect type of the samples, in the plurality of sample production devices, the causes of the defect type of the samples may be found out, so as to rapidly locate the causes of the defect type. As such, targeted inspection may be conducted on some of the sample production devices, which saves labor costs and improves the defect inspection efficiency.

For example, the yield purity index includes at least one of an information gain, an information gain rate, and a Gini coefficient.

In some embodiments, the data processing method further includes: obtaining yield statistical data of the plurality of samples, or yield statistical data of the plurality of samples that pass through the sample production devices, or yield statistical data of the plurality of samples and yield statistical data of the plurality of samples that pass through the sample production devices according to the first parameters and the second parameters of the plurality of samples; and obtaining influencing parameters of the sample production devices according to the yield statistical data of the plurality of samples, or the yield statistical data of the plurality of samples that pass through the sample production devices, or the yield statistical data of the plurality of samples and the yield statistical data of the plurality of samples that pass through the sample production devices.

In some examples, obtaining the influencing parameters of the sample production devices according to the yield statistical data of the plurality of samples and the yield statistical data of the plurality of samples that pass through the sample production devices, includes: calculating a Gini coefficient of each sample production device.

The Gini coefficient of the sample production device satisfies a formula:

$$G = \frac{S_1}{T_1} \times \left[1 - \left(\frac{S_2}{S_1}\right)^2 - \left(\frac{S_3}{S_1}\right)^2\right] + \frac{T_1 - S_1}{T_1} \times \left[1 - \left(\frac{T_2 - S_2}{T_1 - S_1}\right)^2 - \left(\frac{T_3 - S_3}{T_1 - S_1}\right)^2\right],$$

where G represents the Gini coefficient of the sample production device, $S_1$ represents the total number of samples, which pass through the sample production device, in the plurality of samples, $T_1$ represents the total number of the plurality of samples, $S_2$ represents the total number of defective samples, which pass through the sample production device, in the plurality of samples, $T_2$ represents the total number of defective samples in the plurality of samples, $S_3$ represents the total number of non-defective samples, which pass through the sample production device, in the plurality of samples, and $T_3$ represents the total number of non-defective samples in the plurality of samples.

The larger the Gini coefficient of the sample production device, the less the influence degree to which the sample production device affects the occurrence of the defect type on the plurality of samples.

It will be noted that, as for the specific description of the Gini coefficient, reference may be made to corresponding descriptions of the Gini coefficient above, and details will not be repeated here.

In some examples, obtaining the influencing parameters of the sample production devices according to the yield statistical data of the plurality of samples and the yield statistical data of the plurality of samples that pass through the sample production devices, further includes: for each sample production device, calculating a chi-square distribution of samples, which pass through the sample production device, in the plurality of samples.

The chi-square distribution satisfies a formula:

$$V = \begin{cases} \dfrac{K^{(Z/2-1)}e^{-K/2}}{2^{Z/2}\Gamma\left(\dfrac{Z}{2}\right)}, & K > 0; \\ 0, & K \leq 0 \end{cases},$$

where V represents the chi-square distribution of the samples, which pass through the sample production device, in the plurality of samples, Z represents the coefficient, K represents a chi-square value of the plurality of samples for the sample production device, and $$\Gamma\left(\frac{Z}{2}\right)$$

is a gamma distribution function.

It will be noted that, as for specific description of the chi-square distribution, reference may be made to corresponding descriptions of the chi-square distribution above, and details will not be repeated here.

In some examples, obtaining the influencing parameters of the sample production devices according to the yield statistical data of the plurality of samples, and the yield statistical data of the plurality of samples that pass through the sample production devices, further includes: for each sample production device, obtaining a weight value of the sample production device according to the Gini coefficient of the sample production device and the chi-square distribution of the samples, which pass through the sample production device, in the plurality of samples, or a ratio of the total number of defective samples, which pass through the sample production device, in the plurality of samples to the total number of defective samples in the plurality of samples, or the Gini coefficient of the sample production device and the chi-square distribution of the samples, which pass through the sample production device, in the plurality of samples, and a ratio of the total number of defective samples, which pass through the sample production device, in the plurality of samples to the total number of defective samples in the plurality of samples.

The larger the weight value of the sample production device, the greater the influence degree to which the sample production device affects the occurrence of the defect type on the plurality of samples.

In some examples, obtaining the weight value of the sample production device according to the Gini coefficient of the sample production device and the chi-square distribution of the samples, which pass through the sample production device, in the plurality of samples, and the ratio of the total number of the defective samples, which pass through the sample production device, in the plurality of samples to the total number of the defective samples in the plurality of samples, further includes: obtaining the weight value of the sample production device according to a formula:

$$Q = A \times (1-V)^{\frac{1}{\sqrt{G}}} + B \times G - C \times (1-F)^2.$$

Where Q is the weight value of the sample production device, and A, B, and C are all scale factors; V is the chi-square distribution of the samples, which pass through the sample production device, in the plurality of samples, G is the Gini coefficient of the sample production device, and F is the ratio of the total number of the defective samples, which pass through the sample production device, in the plurality of samples to the total number of the defective samples in the plurality of samples.

It will be noted that, as for the specific description of the weight value of the sample production device, reference may be made to corresponding descriptions of the weight value of the sample production device above, and details will not be repeated here.

In some embodiments, the first parameter of the sample includes a defect degree representation value of the sample.

In some examples, the data processing method further includes: obtaining the focus threshold; and dividing the plurality of samples into non-defective samples and defective samples according to defect degree representation values in the first parameters of the plurality of samples and the focus threshold.

For example, the focus threshold may be pre-configured in the data processing device.

For example, obtaining the focus threshold, includes: obtaining the focus threshold according to the defect degree representation values in the first parameters of the plurality of samples.

For example, obtaining the focus threshold according to the defect degree representation values in the first parameters of the plurality of samples, includes:
  dividing an initial array into a first array and a second array according to a first index, the initial array including the defect degree representation values in the first parameters of the plurality of samples that are arranged in order of size, and the first index being used to indicate a division position in the initial array;
  obtaining a first average value of all elements in the first array and a second average value of all elements in the second array;
  generating a third array and a fourth array, the third array being composed of deviation degrees of all the elements of the initial array compared with the first average value, and the fourth array being composed of deviation degrees of all the elements of the initial array compared with the second average value;
  determining a second index, the second index being used to indicate a position at which a positive-negative inversion occurs in differences between all the elements in the third array and corresponding elements in the fourth array;
  updating the first index to the second index if the second index is not equal to the first index, and repeating the above steps until the first index is equal to the second index; and
  calculating an average value of two adjacent elements in the first array and the second array corresponding to the first index as the focus threshold.

In some examples, in a case where a number of the defect degree representation values in the first parameters of the plurality of samples in the initial array is even, the first index is one-half of a value of the number of the defect degree representation values in the first parameters of the plurality of samples in the initial array or an integer that is obtained by subtracting one from one-half of the value.

In some other examples, in a case where the number of the defect degree representation values in the first parameters of the plurality of samples in the initial array is odd, the first index is an integer obtained by rounding up or rounding down one-half of the value of the number of the defect degree representation values in the first parameters of the plurality of samples in the initial array; or, the first index is an integer obtained by rounding up or rounding down a value that is obtained by subtracting one from one-half of the value of the number of the defect degree representation values in the first parameters of the plurality of samples in the initial array.

It will be noted that, as for the specific description of obtaining the focus threshold and dividing the plurality of samples into non-defective samples and defective samples, reference may be made to corresponding descriptions above, and details will not be repeated here.

Figure 13:
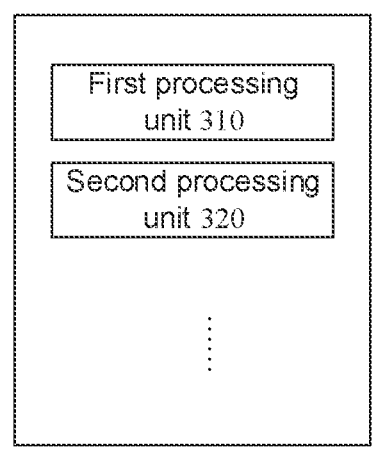
FIG. 13 is a block diagram of a data processing device, in accordance with some embodiments.

Embodiments of the present disclosure provide a data processing device. The data processing device may implement the data processing method provided in any of the above embodiments. As shown in FIG. 13, the data processing device 300 includes a first processing unit 310 and a second processing unit 320.

The first processing unit is configured to obtain a defect type of a sample set. The sample set includes a plurality of samples. Each sample has a first parameter and a second parameter. The first parameter is used to represent a defect degree of the sample with regard to the defect type, and the second parameter is used to represent device informations of sample production devices through which the sample passes.

The second processing unit is configured to calculate yield purity indexes of a plurality of sample production devices on the plurality of samples based on first parameters and second parameters of the plurality of samples, so as to obtain influencing parameters of the plurality of sample production devices.

The influencing parameter of each sample production device is used to represent an influence degree to which the sample production device affects an occurrence of the defect type on the plurality of samples.

In some examples, the data processing device further includes a third processing unit and a fourth processing unit. The third processing unit is configured to display the influencing parameters of the plurality of sample production devices on a second interface. The fourth processing unit is configured to determine the plurality of sample production devices in response to a second input of a user on a third interface.

In some examples, the data processing device further includes a fifth processing unit. The fifth processing unit is configured to: obtain yield statistical data of the plurality of samples, or yield statistical data of the plurality of samples that pass through the sample production devices, or yield statistical data of the plurality of samples and yield statistical data of the plurality of samples that pass through the sample production devices according to the first parameters and the second parameters of the plurality of samples; and obtain influencing parameters of the sample production devices according to the yield statistical data of the plurality of samples, or the yield statistical data of the plurality of samples that pass through the sample production devices, or the yield statistical data of the plurality of samples and the yield statistical data of the plurality of samples that pass through the sample production devices.

In some examples, the first parameter of the sample includes a defect degree representation value of the sample. The data processing device further includes a sixth processing unit. The sixth processing unit is configured to: divide the plurality of samples into non-defective samples and defective samples according to defect degree representation values in the first parameters of the plurality of samples and the focus threshold. In some examples, the data processing device further includes a seventh processing unit. The seventh processing unit is configured to: determine the focus threshold in response to a third input of a user on a fourth interface.

In some examples, the data processing device further includes an eighth processing unit. The eighth processing unit is configured to display a distribution diagram of the non-defective samples and the defective samples in the plurality of samples on a fifth interface.

In some examples, the data processing device further includes a ninth processing unit. The ninth processing unit is configured to: create the sample set in response to a fourth input of the user on a sixth interface.

The embodiment of the device described in FIG. 13 is merely illustrative. For example, the division of the above units is merely a logical functional division, and there may be other division manners in practical implementation. For example, a plurality of modules or components may be combined or may be integrated into another system, or some features may be ignored or not executed. The functional units in the embodiments of the present disclosure may be integrated into a single processing module or may be separate physical units; or, two or more units may be integrated into a single module. The above units in the data processing device may be implemented in a form of hardware or in a form of software functional unit. For example, when implemented by software, the first processing unit, the second processing unit, and the third processing unit described above may be implemented by software functional modules generated after at least one processor reads the program codes stored in a memory. The above units may also be implemented by different hardware in a computer (e.g., a display device). For example, some units of the first processing unit, the second processing unit, and the third processing unit are implemented by a part of processing resources in at least one processor (e.g., one or two cores in a multi-core processor), while remaining units of the first processing unit, the second processing unit, and the third processing unit are implemented by remaining part of the processing resources in the at least one processor (e.g., other cores in the multi-core processor).

For more details on how each unit in the data processing device implements the functions descried above, reference may be made to the descriptions in corresponding method embodiments above, and details will not be repeated here.

The above embodiments may be implemented in whole or in part through software, hardware, firmware, or any combination thereof. In a case where the above embodiments are implemented by using a software program, the software program may be implemented in whole or in part in a form of a computer program product. The computer program product includes one or more computer instructions. When loaded and executed on a computer, the computer instructions generate some of all of the processes or functions provided in the embodiments of the present application. The computer may be a general-purpose computer, a special-purpose computer, a computer network, or any other programmable device. The computer instructions may be stored in a computer-readable storage medium. The computer readable storage medium may be any available media that may be accessed by a computer, or a data storage device, such as a server or data center including one or more available media. The available media may be a magnetic medium (e.g., a floppy disk, a magnetic disk or a magnetic tape), an optical medium (e.g., a digital versatile disk (DVD)), or a semiconductor medium (e.g., a solid state drive (SSD)), etc.

It will be noted that beneficial effects of the data processing device are the same as the beneficial effects of the data processing method as provided in some of the above embodiments, and details will not be repeated here.

Some embodiments of the present disclosure provide a computer-readable storage medium (e.g., a non-transitory computer-readable storage medium). The computer-readable storage medium has stored therein computer program instructions that, when run on a computer, cause the computer to execute the data processing method as described in any of the above embodiments, e.g., one or more steps of the data processing method.

For example, the computer-readable storage medium may include, but is not limited to: a magnetic storage device (e.g., a hard disk, a floppy disk or a magnetic tape), an optical disk (e.g., a compact disk (CD), a digital versatile disk (DVD)), a smart card and a flash memory device (e.g., an erasable programmable read-only memory (EPROM), a card, a stick or a key driver). Various computer-readable storage media described in the present disclosure may represent one or more devices, or other machine-readable storage media for storing information, or one or more devices and other machine-readable storage media for storing information. The term "machine-readable storage media" may include, but is not limited to, wireless channels and various other media capable of storing, containing and/or carrying instructions and/or data.

Some embodiments of the present disclosure further provide a computer program product. The computer program product includes computer program instructions that, when executed on a computer, cause the computer to execute the data processing method as described in the above embodiments, e.g., one or more steps of the data processing method.

Some embodiments of the present disclosure further provide a computer program. When executed on a computer, the computer program causes the computer to execute the data processing method as described in the above embodiments, e.g., one or more steps of the data processing method.

Beneficial effects of the computer-readable storage medium, the computer program product and the computer program are the same as the beneficial effects of the data processing method as described in some of the above embodiments, and details will not be repeated here.

The foregoing descriptions are merely specific implementations of the present disclosure, but the protection scope of the present disclosure is not limited thereto. Any person skilled in the art could conceive of changes or replacements within the technical scope of the present disclosure, which shall all be included in the protection scope of the present disclosure. Therefore, the protection scope of the present disclosure shall be subject to the protection scope of the claims.

What is claimed is:

1. A data processing method applied to an electronic device, the electronic device including a data processing device and a display device coupled to the data processing device, the display device being configured to display interfaces, the interfaces including a first interface, a second interface, a third interface and a sixth interface, the data processing device being configured to implement the data processing method, and the data processing method comprising:

obtaining, by the data processing device, a defect type of a sample set in response to a first input of a user on the first interface of the display device, the sample set including a plurality of samples, each sample having a first parameter and a second parameter, the first parameter being used to represent a defect degree of the sample with regard to the defect type, and the second parameter being used to represent device information of a plurality of sample production devices through which the sample passes, wherein the sample includes a display panel motherboard, the display panel motherboard includes a plurality of display panels, and the device information of the plurality of sample production devices through which the sample passes and information of the defect types of the plurality of samples are generated by the plurality of sample production devices;

calculating, by the data processing device, yield purity indexes of the plurality of sample production devices on the plurality of samples based on first parameters and second parameters of the plurality of samples, so as to obtain influencing parameters of the plurality of sample production devices, an influencing parameter of each sample production device being used to represent an influence degree to which the sample production device affects an occurrence of the defect type on the plurality of samples, correlation between the sample production device and the defect type being determined by the data processing device, so as to locate the defect type and adjust a production process;

transmitting, by the data processing device, the obtained influencing parameters of the plurality of sample production devices to the display device; and displaying, by the display device, the influencing parameters of the plurality of sample production devices on the second interface of the display device; and the data processing method further comprising:

creating, by the data processing device, the sample set in response to a fourth input of the user on the sixth interface of the display device; and determining, by the data processing device, the plurality of sample production devices in response to a second input of the user on the third interface of the display device;

wherein the first parameter of the sample includes a defect degree representation value of the sample, and the data processing method further comprises:

obtaining, by the data processing device, a focus threshold according to defect degree representation values in the first parameters of the plurality of samples; and dividing, by the data processing device, the plurality of samples into non-defective samples and defective samples according to the defect degree representation values in the first parameters of the plurality of samples and the focus threshold; and wherein obtaining, by the data processing device, the focus threshold according to the defect degree representation values in the first parameters of the plurality of samples, includes:

dividing, by the data processing device, an initial array into a first array and a second array according to a first index, the initial array including the defect degree representation values in the first parameters of the plurality of samples that are arranged in order of size, and the first index being used to indicate a division position in the initial array;

obtaining, by the data processing device, a first average value of all elements in the first array and a second average value of all elements in the second array;

generating, by the data processing device, a third array and a fourth array, the third array being composed of deviation degrees of all the elements of the initial array compared with the first average value, and the fourth array being composed of deviation degrees of all the elements of the initial array compared with the second average value;

determining, by the data processing device, a second index, the second index being used to indicate a position at which a positive-negative inversion occurs in differences between all the elements in the third array and corresponding elements in the fourth array;

updating, by the data processing device, the first index to the second index if the second index is not equal to the first index, and repeating the above steps until the first index is equal to the second index; and calculating, by the data processing device, an average value of two adjacent elements in the first array and the second array corresponding to the first index as the focus threshold.

2. The data processing method according to claim 1, further comprising:

obtaining, by the data processing device, yield statistical data of the plurality of samples, or yield statistical data of the plurality of samples that pass through the plurality of sample production devices, or yield statistical data of the plurality of samples and yield statistical data of the plurality of samples that pass through the plurality of sample production devices according to the first parameters and the second parameters of the plurality of samples; and obtaining, by the data processing device, influencing parameters of the plurality of sample production devices according to the yield statistical data of the plurality of samples, or the yield statistical data of the plurality of samples that pass through the plurality of sample production devices, or the yield statistical data of the plurality of samples and the yield statistical data of the plurality of samples that pass through the plurality of sample production devices.

3. The data processing method according to claim 2, wherein obtaining, by the data processing device, the influencing parameters of the plurality of sample production devices according to the yield statistical data of the plurality of samples and the yield statistical data of the plurality of samples that pass through the plurality of sample production devices, includes:

for each sample production device, calculating, by the data processing device, a Gini coefficient of the sample production device, the Gini coefficient of the sample production device satisfying a formula:

$$G = \frac{S_1}{T_1} \times \left[1 - \left(\frac{S_2}{S_1}\right)^2 - \left(\frac{S_3}{S_1}\right)^2\right] + \frac{T_1 - S_1}{T_1} \times \left[1 - \left(\frac{T_2 - S_2}{T_1 - S_1}\right)^2 - \left(\frac{T_3 - S_3}{T_1 - S_1}\right)^2\right],$$

wherein G represents the Gini coefficient of the sample production device, $S_1$ represents a total number of samples, which pass through the sample production device, in the plurality of samples, $T_1$ represents a total number of the plurality of samples, $S_2$ represents a total number of defective samples, which pass through the sample production device, in the plurality of samples, $T_2$ represents a total number of defective samples in the plurality of samples, $S_3$ represents a total number of non-defective samples, which pass through the sample production device, in the plurality of samples, and $T_3$ represents a total number of non-defective samples in the plurality of samples, wherein the larger the Gini coefficient of the sample production device, the less the influence degree to which the sample production device affects the occurrence of the defect type on the plurality of samples.

4. The data processing method according to claim 3, wherein obtaining, by the data processing device, the influencing parameters of the plurality of sample production devices according to the yield statistical data of the plurality of samples and the yield statistical data of the plurality of samples that pass through the plurality of sample production devices, further includes:

for each sample production device, calculating, by the data processing device, a chi-square distribution of samples, which pass through the sample production device, in the plurality of samples, the chi-square distribution satisfying a formula:

$$V = \begin{cases} \dfrac{K^{(Z/2-1)} e^{-K/2}}{2^{Z/2} \Gamma\left(\dfrac{Z}{2}\right)}, & K > 0; \\ 0, & K \leq 0 \end{cases},$$

wherein V represents the chi-square distribution of the samples, which pass through the sample production device, in the plurality of samples, Z represents a coefficient, K represents a chi-square value of the plurality of samples for the sample production device, and $$\Gamma\left(\frac{Z}{2}\right)$$

is a gamma distribution function.

5. The data processing method according to claim 4, wherein obtaining, by the data processing device, the influencing parameters of the plurality of sample production devices according to the yield statistical data of the plurality of samples and the yield statistical data of the plurality of samples that pass through the plurality of sample production devices, further includes:

for each sample production device, obtaining, by the data processing device, a weight value of the sample production device according to the Gini coefficient of the sample production device and the chi-square distribution of the samples, which pass through the sample production device, in the plurality of samples, or a ratio of the total number of the defective samples, which pass through the sample production device, in the plurality of samples to the total number of the defective samples in the plurality of samples, or the Gini coefficient of the sample production device and the chi-square distribution of the samples, which pass through the sample production device, in the plurality of samples, and a ratio of the total number of the defective samples, which pass through the sample production device, in the plurality of samples to the total number of the defective samples in the plurality of samples, wherein the larger the weight value of the sample production device, the greater the influence degree to which the sample production device affects the occurrence of the defect type on the plurality of samples.

6. The data processing method according to claim 5, wherein obtaining, by the data processing device, the weight value of the sample production device according to the Gini coefficient of the sample production device and the chi-square distribution of the samples, which pass through the sample production device, in the plurality of samples, and the ratio of the total number of the defective samples, which pass through the sample production device, in the plurality of samples to the total number of the defective samples in the plurality of samples, includes:

obtaining, by the data processing device, the weight value of the sample production device according to a formula:

$$Q = A \times (1 - V)^{\frac{1}{\sqrt{G}}} + B \times G - C \times (1 - F)^2,$$

wherein Q is the weight value of the sample production device, A, B, and C are all scale factors, V is the chi-square distribution of the samples, which pass through the sample production device, in the plurality of samples, G is the Gini coefficient of the sample production device, and F is the ratio of the total number of the defective samples, which pass through the sample production device, in the plurality of samples to the total number of the defective samples in the plurality of samples.

7. The data processing method according to claim 1, wherein if a number of the defect degree representation values in the first parameters of the plurality of samples in the initial array is even, the first index is one-half of a value of the number of the defect degree representation values in the first parameters of the plurality of samples in the initial array or an integer that is obtained by subtracting one from one-half of the value; and if the number of the defect degree representation values in the first parameters of the plurality of samples in the initial array is odd, the first index is an integer obtained by rounding up or rounding down one-half of the value of the number of the defect degree representation values in the first parameters of the plurality of samples in the initial array; or, the first index is an integer obtained by rounding up or rounding down a value that is obtained by subtracting one from one-half of the value of the number of the defect degree representation values in the first parameters of the plurality of samples in the initial array.

8. The data processing method according to claim 1, wherein the interfaces further include a fifth interface;

the data processing method further comprises:

displaying, by the data processing device, a distribution diagram of the first parameters of the plurality of samples on the fifth interface of the display device.

9. A non-transitory computer-readable storage medium having stored thereon a computer program that, when run on a computer, causes the computer to execute the data processing method according to claim 1.

10. A data processing method applied to an electronic device, the electronic device including a data processing device and a display device coupled to the data processing device, the display device being configured to display interfaces, the data processing device being configured to implement the data processing method, and the data processing method comprising:

obtaining, by the data processing device, a defect type of a sample set, the sample set including a plurality of samples, each sample having a first parameter and a second parameter, the first parameter being used to represent a defect degree of the sample with regard to the defect type, and the second parameter being used to represent device information of a plurality of sample production devices through which the sample passes, wherein the sample includes a display panel motherboard, the display panel motherboard includes a plurality of display panels, and the device information of the plurality of sample production devices through which the sample passes and information of the defect types of the plurality of samples are generated by the plurality of sample production devices;

calculating, by the data processing device, yield purity indexes of the plurality of sample production devices on the plurality of samples based on first parameters and second parameters of the plurality of samples, so as to obtain influencing parameters of the plurality of sample production devices, an influencing parameter of each sample production device being used to represent an influence degree to which the sample production device affects an occurrence of the defect type on the plurality of samples, correlation between the sample production device and the defect type being determined by the data processing device, so as to locate the defect type and adjust a production process; and transmitting, by the data processing device, the obtained influencing parameters of the plurality of sample production devices to the display device; and the data processing method further comprising:

creating, by the data processing device, the sample set; and determining, by the data processing device, the plurality of sample production devices;

wherein the first parameter of the sample includes a defect degree representation value of the sample; and the data processing method further comprises:

obtaining, by the data processing device, a focus threshold; and dividing, by the data processing device, the plurality of samples into non-defective samples and defective samples according to defect degree representation values in the first parameters of the plurality of samples and the focus threshold;

wherein obtaining, by the data processing device, the focus threshold includes:

obtaining, by the data processing device, the focus threshold according to the defect degree representation values in the first parameters of the plurality of samples; and wherein obtaining, by the data processing device, the focus threshold according to the defect degree representation values in the first parameters of the plurality of samples, includes:

dividing, by the data processing device, an initial array into a first array and a second array according to a first index, the initial array including the defect degree representation values in the first parameters of the plurality of samples that are arranged in order of size, and the first index being used to indicate a division position in the initial array;

obtaining, by the data processing device, a first average value of all elements in the first array and a second average value of all elements in the second array;

generating, by the data processing device, a third array and a fourth array, the third array being composed of deviation degrees of all the elements of the initial array compared with the first average value, and the fourth array being composed of deviation degrees of all the elements of the initial array compared with the second average value;

determining, by the data processing device, a second index, the second index being used to indicate a position at which a positive-negative inversion occurs in differences between all the elements in the third array and corresponding elements in the fourth array;

updating, by the data processing device, the first index to the second index if the second index is not equal to the first index, and repeating above steps until the first index is equal to the second index; and calculating, by the data processing device, an average value of two adjacent elements in the first array and the second array corresponding to the first index as the focus threshold.

11. The data processing method according to claim 10, further comprising: obtaining, by the data processing device, yield statistical data of the plurality of samples, or yield statistical data of the plurality of samples that pass through the plurality of sample production devices, or yield statistical data of the plurality of samples and yield statistical data of the plurality of samples that pass through the plurality of sample production devices according to the first parameters and the second parameters of the plurality of samples; and obtaining, by the data processing device, influencing parameters of the sample production device according to the yield statistical data of the plurality of samples, or the yield statistical data of the plurality of samples that pass through the plurality of sample production devices or the yield statistical data of the plurality of samples and the yield statistical data of the plurality of samples that pass through the plurality of sample production devices.

12. A data processing device included in an electronic device, the electronic device including the data processing device and a display device coupled to the data processing device, the interfaces including a first interface, a second interface, a third interface and a sixth interface, the display device being configured to display interfaces, and the data processing device comprising:

a memory having stored thereon one or more computer programs; and a processor coupled to the memory, the processor being configured to execute the computer programs to cause the data processing device to implement a data processing method, the data processing method comprising:

obtaining a defect type of a sample set in response to a first input of a user on the first interface of the display device, the sample set including a plurality of samples, each sample having a first parameter and a second parameter, the first parameter being used to represent a defect degree of the sample with regard to the defect type, and the second parameter being used to represent device information of a plurality of sample production devices through which the sample passes, wherein the sample includes a display panel motherboard, the display panel motherboard includes a plurality of display panels, and the device information of the plurality of sample production devices through which the sample passes and information of the defect types of the plurality of samples are generated by the plurality of sample production devices;

calculating yield purity indexes of the plurality of sample production devices on the plurality of samples based on first parameters and second parameters of the plurality of samples, so as to obtain influencing parameters of the plurality of sample production devices, an influencing parameter of each sample production device being used to represent an influence degree to which the sample production device affects an occurrence of the defect type on the plurality of samples, correlation between the sample production device and the defect type being determined by the data processing device, so as to locate the defect type and adjust a production process;

transmitting the obtained influencing parameters of the plurality of sample production devices to the display device; and displaying the influencing parameters of the plurality of sample production devices on the second interface of the display device; and the data processing method further comprising:

creating the sample set in response to a fourth input of the user on the sixth interface of the display device; and determining the plurality of sample production devices in response to a second input of the user on the third interface of the display device;

wherein the first parameter of the sample includes a defect degree representation value of the sample, and the data processing method further comprises:

obtaining by the data processing device, a focus threshold according to defect degree representation values in the first parameters of the plurality of samples; and dividing by the data processing device, the plurality of samples into non-defective samples and defective samples according to the defect degree representation values in the first parameters of the plurality of samples and the focus threshold; and wherein obtaining the focus threshold according to the defect degree representation values in the first parameters of the plurality of samples, includes:

dividing an initial array into a first array and a second array according to a first index, the initial array including the defect degree representation values in the first parameters of the plurality of samples that are arranged in order of size, and the first index being used to indicate a division position in the initial array;

obtaining a first average value of all elements in the first array and a second average value of all elements in the second array;

generating a third array and a fourth array, the third array being composed of deviation degrees of all the elements of the initial array compared with the first average value, and the fourth array being composed of deviation degrees of all the elements of the initial array compared with the second average value;

determining a second index, the second index being used to indicate a position at which a positive-negative inversion occurs in differences between all the elements in the third array and corresponding elements in the fourth array;

updating he first index to the second index if the second index is not equal to the first index, and repeating the above steps until the first index is equal to the second index; and calculating an average value of two adjacent elements in the first array and the second array corresponding to the first index as the focus threshold;

or, the data processing method comprising:

obtaining the defect type of the sample set, the sample set including the plurality of samples, each sample having the first parameter and the second parameter, the first parameter being used to represent the defect degree of the sample with regard to the defect type, and the second parameter being used to represent the device information of the plurality of sample production devices through which the sample passes, wherein the sample includes a display panel motherboard, the display panel motherboard includes a plurality of display panels, and the device information of the plurality of sample production devices through which the sample passes and information of the defect types of the plurality of samples are generated by the plurality of sample production devices;

calculating the yield purity indexes of the plurality of sample production devices on the plurality of samples based on the first parameters and the second parameters of the plurality of samples, so as to obtain the influencing parameters of the plurality of sample production devices, the influencing parameter of each sample production device being used to represent the influence degree to which the sample production device affects the occurrence of the defect type on the plurality of samples, correlation between the sample production device and the defect type being determined by the data processing device, so as to locate the defect type and adjust a production process; and transmitting the obtained influencing parameters of the plurality of sample production devices to the display device; and the data processing method further comprising:

creating the sample set; and determining the plurality of sample production devices;

wherein the first parameter of the sample includes a defect degree representation value of the sample; and the data processing method further comprises:

obtaining, by the data processing device, a focus threshold; and dividing, by the data processing device, the plurality of samples into non-defective samples and defective samples according to defect degree representation values in the first parameters of the plurality of samples and the focus threshold;

wherein obtaining the focus threshold includes:

obtaining the focus threshold according to the defect degree representation values in the first parameters of the plurality of samples; and wherein obtaining the focus threshold according to the defect degree representation values in the first parameters of the plurality of samples, includes:

dividing an initial array into a first array and a second array according to a first index, the initial array including the defect degree representation values in the first parameters of the plurality of samples that are arranged in order of size, and the first index being used to indicate a division position in the initial array;

obtaining a first average value of all elements in the first array and a second average value of all elements in the second array;

generating a third array and a fourth array, the third array being composed of deviation degrees of all the elements of the initial array compared with the first average value, and the fourth array being composed of deviation degrees of all the elements of the initial array compared with the second average value;

determining a second index, the second index being used to indicate a position at which a positive-negative inversion occurs in differences between all the elements in the third array and corresponding elements in the fourth array;

updating the first index to the second index if the second index is not equal to the first index, and repeating above steps until the first index is equal to the second index; and calculating an average value of two adjacent elements in the first array and the second array corresponding to the first index as the focus threshold.

13. An electronic device, comprising:

the data processing device according to claim 12; and the display device configured to display the interfaces.

14. A data processing system, comprising:

the data processing device according to claim 12;

a distributed storage device configured to store production data generated by the plurality of sample production devices; and the display device configured to display the interfaces.

* * * * *